(12) United States Patent
Adachi et al.

(10) Patent No.: US 8,599,669 B2
(45) Date of Patent: Dec. 3, 2013

(54) REPRODUCED SIGNAL QUALITY JUDGING METHOD

(75) Inventors: Yoshihisa Adachi, Kyoto (JP); Shigemi Maeda, Yamatokoriyama (JP); Atsushi Etoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/422,963

(22) Filed: Mar. 16, 2012

(65) Prior Publication Data
US 2012/0224467 A1    Sep. 6, 2012

Related U.S. Application Data

(62) Division of application No. 12/226,353, filed as application No. PCT/JP2007/056286 on Mar. 27, 2007, now Pat. No. 8,189,442.

(30) Foreign Application Priority Data

Apr. 28, 2006  (JP) ................................. 2006-127063
Jan. 11, 2007  (JP) ................................. 2007-003859

(51) Int. Cl.
G11B 7/00    (2006.01)

(52) U.S. Cl.
USPC ..................................... 369/59.11; 369/53.31

(58) Field of Classification Search
USPC ............... 369/47.5–47.53, 59.11, 59.12, 116, 369/53.31, 53.35, 124.01, 124.1, 124.11
See application file for complete search history.

(56) References Cited

U.S. PATENT DOCUMENTS 5,745,467 A    4/1998    Sakaue et al.
6,101,159 A    8/2000    Shoji
6,160,784 A    12/2000   Maeda et al.
6,188,656 B1   2/2001    Shoji et al.

(Continued)

FOREIGN PATENT DOCUMENTS

CN    1244003 A    2/2000
CN    1276597 A    12/2000

(Continued)

OTHER PUBLICATIONS

International Search Report, Jul. 3, 2007, issued in PCT/JP2007/056286.

(Continued)

*Primary Examiner* — Thang Tran
(74) *Attorney, Agent, or Firm* — Edwards Wildman Palmer LLP; David G. Conlin; David A. Tucker

(57) ABSTRACT

Recording mark forming method utilizing a device including a laser and a laser drive carried by a pickup having a movement drive wherein a control controls the drives to irradiate a recording medium with laser pulse sequences to form recording marks having recording mark lengths between a predetermined and maximum lengths, a top section, a last section including a cooling period, and an intermediate period. Heat of mark front edges is controlled by top section recording parameters classified according to recording mark lengths and recording parameters of first through maximum recording mark lengths are classified into a same group. Heat of mark rear edges is controlled by cooling start positions for cooling periods classified according to recording mark lengths. Cooling start positions for a second predetermined mark length through the maximum mark length are classified into a same group. The second mark length is longer than the first mark length.

1 Claim, 13 Drawing Sheets

(56) References Cited

U.S. PATENT DOCUMENTS

| | | |
|---|---|---|
| 6,345,026 B1 | 2/2002 | Furukawa et al. |
| 6,359,846 B1 | 3/2002 | Shoji et al. |
| 6,762,986 B1 | 7/2004 | Seo |
| 6,925,040 B1 | 8/2005 | Maeda et al. |
| 7,006,419 B2 | 2/2006 | Yokoi |
| 7,031,241 B2 | 4/2006 | Nakajo |
| 7,340,931 B1 | 3/2008 | Chuang |
| 7,675,826 B2 | 3/2010 | Sutardja |
| 7,773,479 B1 | 8/2010 | Sutardja et al. |
| 8,072,856 B2 * | 12/2011 | Adachi et al. ............... 369/47.51 |
| 8,072,864 B2 * | 12/2011 | Adachi et al. ............... 369/59.11 |
| 8,169,869 B2 * | 5/2012 | Adachi et al. ............... 369/59.11 |
| 2002/0067669 A1 | 6/2002 | Maeda et al. |
| 2002/0067670 A1 | 6/2002 | Akiyama et al. |
| 2003/0031108 A1 | 2/2003 | Furumiya et al. |
| 2003/0043896 A1 | 3/2003 | Proidl |
| 2004/0022151 A1 | 2/2004 | Furumiya et al. |
| 2004/0032808 A1 | 2/2004 | Ahn et al. |
| 2004/0100885 A1 | 5/2004 | Nakamura et al. |
| 2004/0246861 A1 | 12/2004 | Akiyama et al. |
| 2005/0002306 A1 | 1/2005 | Urita |
| 2005/0030871 A1 | 2/2005 | Kato et al. |
| 2005/0048057 A1 | 3/2005 | Day |
| 2005/0058047 A1 | 3/2005 | Fujita et al. |
| 2005/0122872 A1 | 6/2005 | Adachi et al. |
| 2005/0169148 A1 | 8/2005 | Noguchi et al. |
| 2005/0174906 A1 | 8/2005 | Narumi et al. |
| 2005/0243679 A1 | 11/2005 | Maeda et al. |
| 2005/0243680 A1 | 11/2005 | Maeda et al. |
| 2005/0254388 A1 | 11/2005 | Maeda et al. |
| 2005/0265184 A1 | 12/2005 | Sekiguchi et al. |
| 2005/0270939 A1 | 12/2005 | Kashihara et al. |
| 2005/0276169 A1 | 12/2005 | Mizuno et al. |
| 2005/0286390 A1 | 12/2005 | Minemura et al. |
| 2006/0077826 A1 | 4/2006 | Izuka |
| 2006/0140094 A1 | 6/2006 | Tabata et al. |
| 2006/0140097 A1 | 6/2006 | Tasaka et al. |
| 2006/0203675 A1 | 9/2006 | Tomura et al. |
| 2006/0274623 A1 | 12/2006 | Perez et al. |
| 2006/0274625 A1 | 12/2006 | Nakamura et al. |
| 2006/0291351 A1 | 12/2006 | Tomura et al. |
| 2007/0047407 A1 | 3/2007 | Chang et al. |
| 2007/0070845 A1 | 3/2007 | Sutardja |
| 2007/0121462 A1 | 5/2007 | Ishii et al. |
| 2007/0127341 A1 | 6/2007 | Sagara et al. |
| 2007/0127344 A1 | 6/2007 | Mizuno et al. |
| 2007/0165506 A1 | 7/2007 | Nakamura et al. |
| 2007/0183285 A1 | 8/2007 | Nishimura et al. |
| 2007/0237049 A1 | 10/2007 | Maeda et al. |
| 2008/0037395 A1 | 2/2008 | Nishimura et al. |
| 2008/0298200 A1 | 12/2008 | Nakamura et al. |
| 2010/0027399 A1 | 2/2010 | Maeda et al. |
| 2010/0149941 A1 | 6/2010 | Tamaki et al. |

FOREIGN PATENT DOCUMENTS

| | | |
|---|---|---|
| JP | 07-225947 A | 8/1995 |
| JP | 08-287465 | 11/1996 |
| JP | 2000-155946 | 2/2000 |
| JP | 2000-231719 | 8/2000 |
| JP | 2003-022531 | 1/2003 |
| JP | 2003-242646 | 8/2003 |
| JP | 2005-071396 | 3/2005 |
| JP | 2005-092906 | 4/2005 |
| JP | 2005-092942 | 4/2005 |
| JP | 2006-012226 | 1/2006 |
| WO | WO-00/16322 | 3/2000 |
| WO | WO-00/16323 | 3/2000 |

OTHER PUBLICATIONS

European Search Report dated Feb. 25, 2010, issued in European Patent Application No. 10 00 0608.

U.S. Office Action dated Nov. 19, 2010 for U.S. Appl. No. 12/285,891.

U.S. Office Action dated May 13, 2011 for U.S. Appl. No. 12/662,114.

U.S. Office Action dated May 3, 2011 for U.S. Appl. No. 12/662,113.

U.S. Office Action dated May 3, 2011 for U.S. Appl. No. 12/662,111.

U.S. Office Action dated May 23, 2011 for U.S. Appl. No. 12/662,112.

Office Action dated Mar. 14, 2011 issued in U.S. Appl. No. 12/662,115.

Office Action dated Mar. 11, 2011 issued in U.S. Appl. No. 12/662,110.

U.S. Office Action dated Nov. 8, 2011 for U.S. Appl. No. 12/662,112.

U.S. Office Action dated Oct. 28, 2011 for U.S. Appl. No. 12/662,115.

U.S. Office Action dated Feb. 11, 2013 for U.S. Appl. No. 13/423,013.

* cited by examiner

FIG. 7

| | RECORDING MARK LENGTH |
|---|---|
| | 4T OR LONGER |
| dTlp | b4 |

FIG. 8

| | RECORDING MARK LENGTH | |
|---|---|---|
| | 4T | 5T OR LONGER |
| dTlp | b4 | b5 |

FIG. 9

| | RECORDING MARK LENGTH | | |
|---|---|---|---|
| | 4T | 5T | 6T OR LONGER |
| dTlp | b4 | b5 | b6 |

FIG. 10

| | RECORDING MARK LENGTH | | | |
|---|---|---|---|---|
| | 4T | 5T | 6T | 7T OR LONGER |
| dTlp | b4 | b5 | b6 | b7 |

FIG. 11

| | RECORDING MARK LENGTH | | |
|---|---|---|---|
| | 2T | 3T | 4T OR LONGER |
| dTtop | c2 | c3 | c4 |

FIG. 16 (a)

| | RECORDING MARK LENGTH | | |
|---|---|---|---|
| | 2T | 3T | 4T OR LONGER |
| dTtop | d4 | d5 | d6 |

FIG. 16 (b)

| | RECORDING MARK LENGTH | | | |
|---|---|---|---|---|
| | 2T | 3T | 4T | 5T OR LONGER |
| dTlp | e4 | e5 | e6 | e7 |

FIG. 17    PRIOR ART

|  | | RECORDING MARK LENGTH | | |
|---|---|---|---|---|
|  | | 2T | 3T | 4T OR LONGER |
| FRONT SPACE LENGTH | 2T | a22 | a23 | a24 |
|  | 3T | a32 | a33 | a34 |
|  | 4T | a42 | a43 | a44 |
|  | 5T OR LONGER | a52 | a53 | a54 |

FIG. 18    PRIOR ART

|  | | RECORDING MARK LENGTH | |
|---|---|---|---|
|  | | 3T | 4T OR LONGER |
| REAR SPACE LENGTH | 2T | a23 | a24 |
|  | 3T | a33 | a34 |
|  | 4T | a43 | a44 |
|  | 5T OR LONGER | a53 | a54 |

REPRODUCED SIGNAL QUALITY JUDGING METHOD

This application is a divisional application of copending U.S. patent application Ser. No. 12/226,353, filed Oct. 16, 2008 by Yoshihisa Adachi, Shigemi Maeda and Atsushi Etoh and entitled RECORDING PARAMETER SETTING DEVICE, PROGRAM THEREOF, COMPUTER-READABLE RECORDING MEDIUM CONTAINING THE PROGRAM, INFORMATION RECORDING MEDIUM, RECORDING/REPRODUCING DEVICE, AND RECORDING PARAMETER SETTING METHOD, which copending parent application claims priority to Japanese Application No. 2006-127063, filed Apr. 28, 2006 and Japanese Application No. 2007-03859, filed Jan. 11, 2007.

TECHNICAL FIELD

The present invention relates to a recording parameter setting device for recording and reproducing information, a program thereof, a computer-readable recording medium containing the program, an information recording medium, a recording/reproducing device, and a recording parameter setting method.

BACKGROUND ART

Recording/reproducing devices for an information recording medium (such as an optical disc) which stores large amount of data have conventionally adopted an art which records information by focusing a laser beam onto an information recording medium and heating the information recording medium, so as to change physical characteristics of the medium. According to the art, binary digital data is recorded on the information recording medium. The binary digital data is expressed by (i) two states including a state where a recording mark is formed on the information recording medium (hereafter, referred to as "mark") and a state where a recording mark is not formed (hereafter, referred to as "space") and (ii) each length of the two states. The digital data is called "recording information" herein. Actually, the recording information is recorded on the information recording medium such that: (1) a recording parameter is set in accordance with the recording information to be recorded; (2) the recording parameter changes the laser beam; (3) the laser beam thus changed forms a recording mark on the information recording medium, thereby recording the recording information on the information recording medium.

In recent years, in response to an increase in the amount of data which is processed, recording speed is being increased for the purpose of reducing the processing time of a recording/reproducing device. Even when an information recording medium becomes capable of recording at a high speed, the information recording medium needs to be capable of recording also at a low speed so as to ensure backward compatibility. Therefore, the information recording medium capable of recording at a high speed has a property which is apt to accumulate heat so as to improve its recording sensitivity. The heat accumulation can distort a recording mark, thereby leading to deterioration in a reproduced signal quality. Therefore, in an information recording medium capable of recording at a high speed, it is important to control heat for forming a recording mark.

As an art which is used for controlling heat for forming a recording mark, there has been known write strategy, which is a high-level laser output control technology. The write strategy carries out laser output control in accordance with the recording parameter so as to control heat for forming a recording mark. As the number of recording parameters increases, the control of heat for forming a recording mark becomes complicated. There is a method where a recording parameter is once stored in an information recording medium in a form of a look-up table, and the recording parameter is read out from the look-up table by a recording/reproducing device so as to set the recoding parameter. In this method, the increased number of recording parameters prolongs read-out time of information from the look-up table by using the recording/reproducing device. This causes delay in the timing of starting a recording process. Therefore, it is preferable to use as small number of recording parameters as possible.

In view of this, for example, Patent Document 1: Japanese Unexamined Patent Application Publication, No. 2005-92942 (published on Apr. 7, 2005) discloses an optical disc recording method including a look-up table which defines recording parameters. In the method, the procedure of controlling heat for forming a recording mark proceeds while the table is looked up.

Specifically, Patent Document 1 describes as follows. A recording parameter for a top pulse which controls heat of a front edge, at which a forming process of a recording mark starts, uses a look-up table in which (i) front space lengths of recording marks are classified into four groups: 2T, 3T, 4T, and 5T or longer and (ii) recording mark lengths are classified into three groups: 2T, 3T, and 4T or longer (see FIG. 17). Also, a recording parameter for a last pulse which controls heat of a rear edge, at which a forming process of a recording mark ends, uses a look-up table in which (i) rear space lengths of recording marks are classified into four groups: 2T, 3T, 4T, and 5T or longer and (ii) recording mark lengths are classified into two groups: 3T and 4T or longer (see FIG. 18). That is, in the look-up table disclosed in Patent Document 1, mark lengths of 4T or longer are classified into the same group, and front and rear space lengths of 5T or longer are classified into the same group. This reduces the number of recording parameters. Thereby, heat for forming a recording mark is controlled at a front edge and a rear edge. The symbol "T" herein represents a time equivalent to one cycle of a clock. For example, a mark length of 2T indicates a region (i.e., a recording region) where a recording mark "1" is formed for a time equivalent to two cycles of the clock. Similarly, a space length of 2T indicates a region where no recording mark is formed for a time equivalent to two cycles of the clock.

With a further increase in a recording speed expected in the future, a recording mark will be formed on an information recording medium having improved recording sensitivity. When a recording mark is formed by using a laser beam, heat distribution is high at a rear edge of a recording mark, at which rear edge the forming process of the recording mark ends. Therefore, the increase in the recording speed will strengthen the tendency to accumulate heat at the rear edge. This leads to an increasing necessity for controlling heat at the rear edge more strictly by using the recording parameter.

Patent Document 1, however, uses the same setting for (i) the classification of recording parameters for controlling heat of a front edge, at which a forming process of a recording mark starts and (ii) the classification of recording parameters for controlling heat of a rear edge, which needs to be controlled strictly. Specifically, both types of the recording parameters use a look-up table in which recording mark lengths of 4T or longer are classified into the same group. In addition, Patent Document 1 does not specifically disclose on what basis the recording mark lengths, the front space lengths, and the rear space lengths are classified in the look-up table, which defines the recording parameters, for the purpose of reducing the number of recording parameters. Therefore, although the number of the recording parameters is reduced, there is a problem that a good reproduced signal quality is not guaranteed (i.e., a reproduced signal quality as desired is not guaranteed) in reading out a recording mark actually.

DISCLOSURE OF INVENTION

The present invention is made in view of the foregoing conventional problem, and has an object for providing: a recording parameter setting device configured to form a recording mark capable of surely obtaining a good reproduced signal quality while the number of recording parameters to be used is reduced; a program thereof; a computer-readable recording medium containing the program; an information recording medium; a recording/reproducing device; and a recording parameter setting method.

In order to attain the object, a recording parameter setting device of the present invention is a recording parameter setting device configured to set a recording parameter for forming a recording mark on an information recording medium in accordance with recording information, comprising: (i) trial recording parameter setting means configured to inquire, in accordance with the recording information, a storage section containing recording parameters used for controlling heat of recording marks, and to set a trial recording parameter for carrying out trial recording, wherein (a) the recording parameters are used for controlling heat of at least rear edges of the recording marks, at which rear edges a forming process of the recording marks ends, (b) the recording parameters are classified in accordance with at least recording mark lengths out of the recording information, and (c) recording parameters of a predetermined recording mark length or longer are classified into a same group; and (ii) reproduced signal quality judging means configured to further classify the recording parameters of the predetermined recording mark length or longer into more detailed groups and to cause to carry out the trial recording again if a reproduced signal obtained by reproduction of the trial recording carried out in accordance with the trial recording parameter does not satisfy a predetermined reproduced signal quality, and configured to set the trial recording parameter as the recording parameter if the reproduced signal satisfies the predetermined reproduced signal quality.

With the invention, the recording parameters for controlling the heat of at least the rear edge of the recording mark are classified into the same group if the recording mark length is equal to or longer than the predetermined recording mark length. This reduces the number of recording parameters as a whole, compared with a method in which the recording parameters are classified into different groups for every recording mark length.

The "classification" is, in other words, grouping in accordance with the recording mark length. Specifically, by the classification, a certain value (or a certain amount of change) is given to recording parameters for recording mark lengths which are put together into one group.

Also, the invention has an arrangement such that (i) the trial recording parameter setting means sets a trial recording parameter for trial recording in accordance with recording information; and (ii) the reproduced signal quality judging means judges whether or not the reproduced signal obtained by reproduction of the trial recording carried out in accordance with the trial recording parameter satisfies a predetermined reproduced signal quality. The reproduced signal quality judging means carries out the followings: if the reproduced signal does not satisfy the predetermined reproduced signal quality, the recording parameters of the predetermined recording mark length or longer are further classified into detailed groups in accordance with the recording mark length, and trial recording is carried out again; and if the reproduced signal satisfies the predetermined reproduced signal quality, the trial recording parameter is set as the recording parameter. That is, the process of determining the recording parameter which satisfies the predetermined reproduced signal quality proceeds while the number of classifications of recording parameters is being increased. This makes it possible to further reduce the number of classifications of recording parameters in a case where the recording parameter satisfying the predetermined reproduced signal quality is determined. A recording parameter for controlling heat of a rear edge, which is more apt to be affected by heat than any other regions in the recording mark, is determined so as to satisfy the predetermined reproduced signal quality. This compensates the effect caused by the heat accumulated at the rear edge, thereby forming a recording mark capable of providing a good reproduced signal quality.

This makes it possible to form a recording mark capable of surely providing a good reproduced signal quality while the number of recording parameters to be used is reduced.

Also, in order to attain the object, the recording parameter setting device of the present invention is a recording parameter setting device configured, to set a recording parameter for forming a recording mark on an information recording medium in accordance with recording information, wherein the recording parameters include: (a) recording parameters used for controlling heat of a front edge of the recording mark, classified in accordance with at least recording mark lengths out of the recording information, and classified into the same group if the recording mark length is equal to or longer than a predetermined recording mark length; and (b) recording parameters used for controlling heat of a rear edge of the recording mark, classified in accordance with at least the recording mark lengths out of the recording information, and classified into more detailed groups than the recording parameters used for controlling the heat of the front edge if the recording mark length is equal to or longer than the predetermined recording mark length.

This allows the recording parameters for controlling the heat of the rear edge of the recording mark to be classified into more detailed groups than the recording parameters for controlling the heat of the front edge of the recording mark. This reduces the number of recording parameters as a whole, compared with a method of increasing the number of classifications of the recording parameters for controlling the heat of both the front and rear edges. The rear edge of the recording mark is more apt to be affected by heat than any other regions in the recording mark. In view of this, the recording parameters for controlling the heat of the rear edge are classified into more detailed groups. This makes it possible to control more strictly the heat of the rear edge, at which the forming process of the recording mark ends, and to compensate the effect caused by the accumulated heat. As a result, a recording mark capable of providing a good reproduced signal quality can be formed.

This makes it possible to form a recording mark capable of surely providing a good reproduced signal quality while the number of recording parameters to be used is reduced.

In order to attain the object, an information recording medium of the present invention is an information recording medium configured to contain, in a predetermined region, a recording parameter for forming a recording mark in accordance with recording information, wherein the recording parameters include: (a) recording parameters used for controlling heat of a front edge of the recording mark, classified in accordance with at least recording mark lengths out of the recording information, and classified into the same group if the recording mark length is equal to or longer than a predetermined recording mark length; and (b) recording parameters used for controlling heat of a rear edge of the recording mark, classified in accordance with at least the recording mark lengths out of the recording information, and classified into the same group if the recording mark length is longer than the predetermined recording mark length.

With the invention, the recording parameters for controlling the heat of at least the front edge of the recording mark are classified into the same group if the recording mark length is equal to or longer than the predetermined recording mark length. Also, with the invention, the recording parameters for controlling the heat of the rear edge are classified into the same group if the recording mark length is longer than the predetermined recording mark length. This reduces the number of recording parameters as a whole, compared with a method in which the recording parameters are classified into different groups for every recording mark length.

Also, this invention allows the recording parameters for controlling the heat of the rear edge of the recording mark to be classified into more detailed groups than the recording parameters for controlling the heat of the front edge of the recording mark. This reduces the number of recording parameters as a whole, compared with a method of increasing the number of classifications of the recording parameters for controlling the heat of both the front and rear edges.

This makes it possible to form a recording mark capable of surely providing a good reproduced signal quality while the number of recording parameters to be used is reduced.

In order to attain the object, a recording parameter setting method of the present invention is a recording parameter setting method for setting a recording parameter for forming a recording mark on an information recording medium in accordance with recording information, comprising: (i) a trial recording parameter setting step which inquires, in accordance with the recording information, a storage section containing recording parameters used, for controlling heat of at least a rear edge (at which a forming process of the recording mark ends) of the recording mark, classified in accordance with at least recording mark lengths out of the recording information, and classified into the same group if the recording mark length is equal to or longer than a predetermined recording mark length, so as to set a trial recording parameter for carrying out trial recording; and (ii) a reproduced signal quality judging step: which further classifies the recording parameters for the recording mark length equal to or longer than the predetermined recording mark length into detailed groups and carries out trial recording again if a reproduced signal obtained by the reproduction of the trial recording carried out in accordance with the trial recording parameter does not satisfy a predetermined reproduced signal quality; and which sets the trial, recording parameter as the recording parameter if the reproduced signal satisfies the predetermined reproduced signal quality.

The invention makes it possible to form a recording mark capable of surely providing a good reproduced signal quality while the number of recording parameters to be used is reduced.

Also, in order to attain the object, a recording parameter setting method of the present invention is a recording parameter setting method for setting a recording parameter for forming a recording mark on an information recording medium in accordance with recording information, comprising: (i) a first recording parameter classification step which classifies, in accordance with at least recording mark lengths out of the recording information, recording parameters used for controlling heat of a front edge of the recording mark and classifies the recording parameters into the same group if the recording mark length is equal to or longer than a predetermined recording mark length; and (ii) a second recording parameter classification step which classifies, in accordance with at least the recording mark lengths out of the recording information, recording parameters used for controlling heat of a rear edge of the recording mark, and which further classifies the recording parameters into more detailed groups than the recording parameters used for controlling the heat of the front edge if the recording mark length is equal to or longer than the predetermined recording mark length.

The foregoing invention makes it possible to form a recording mark capable of surely providing a good reproduced signal quality while the number of recording parameters to be used is reduced.

BRIEF DESCRIPTION OF DRAWINGS

FIG. 7 is a view illustrating one of the embodiments of a look-up table in accordance with the present invention.

FIG. 8 is a view illustrating one of the embodiments of a look-up table in accordance with the present invention.

FIG. 9 is a view illustrating one of the embodiments of a look-up table in accordance with the present invention.

FIG. 10 is a view illustrating one of the embodiments of a look-up table in accordance with the present invention.

FIG. 11 is a view illustrating one of the embodiments of a look-up table in accordance with the present invention.

FIG. 16 (a) is a view illustrating one of the embodiments of a look-up table recorded on an optical disc in the present invention.

FIG. 16 (b) is a view illustrating one of the embodiments of a look-up table recorded on an optical disc in the present invention.

FIG. 17 is a view illustrating a look-up table in accordance with a conventional art.

FIG. 18 is a view illustrating a look-up table in accordance with a conventional art.

BEST MODE FOR CARRYING OUT THE INVENTION

One of the embodiments of the present invention is described below with reference to FIG. 1 through FIG. 16 (b).

Figure 2:
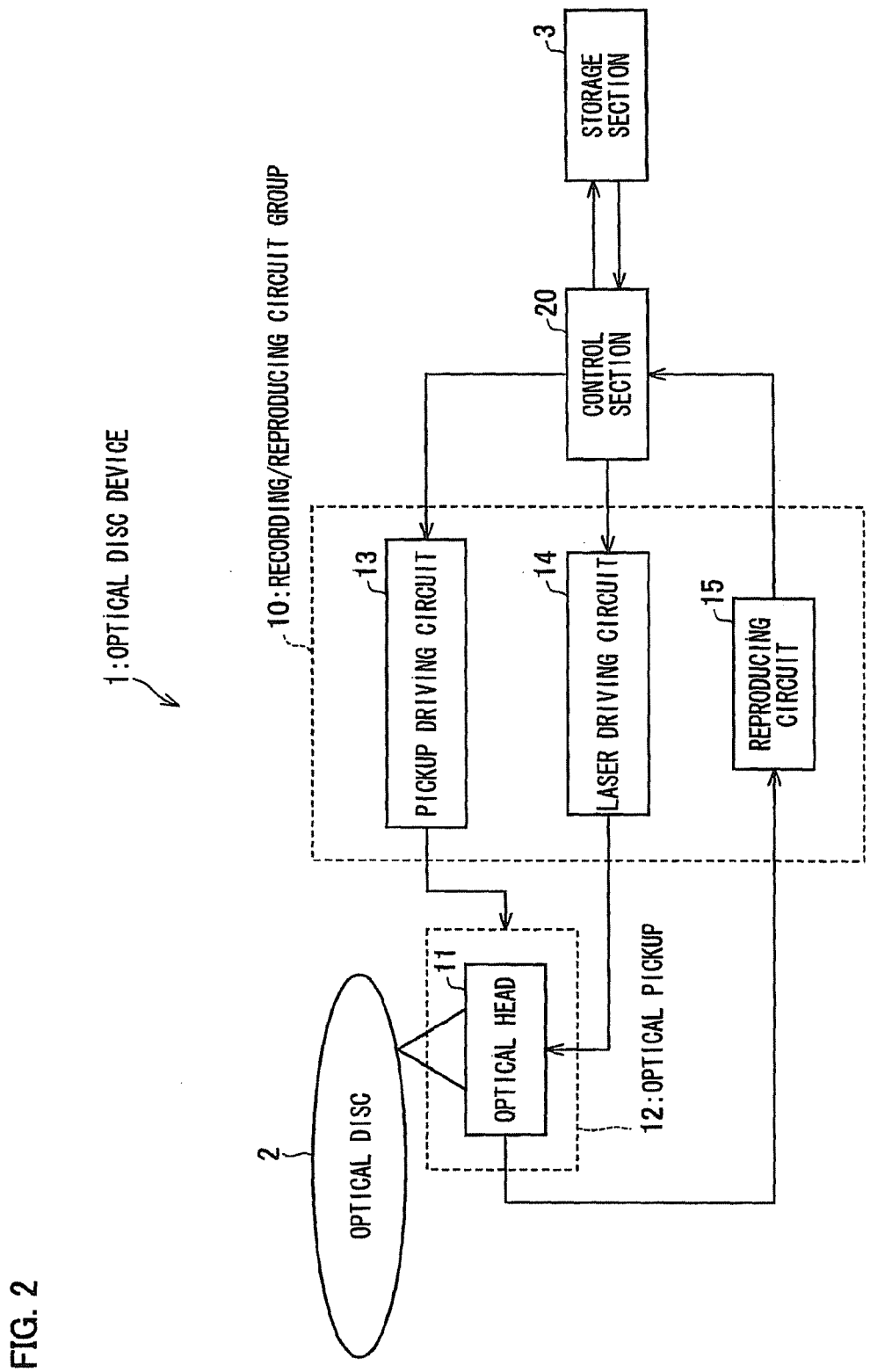
FIG. 2 is a block diagram illustrating one of the embodiments of the optical disc device.

Firstly, as an example of a recording/reproducing device of the present embodiment, an optical disc device (recording/reproducing device) 1 is described. As illustrated in FIG. 2, the optical disc device 1 of the present embodiment includes an optical head (optical pickup) 11, a pickup 12, a pickup driving circuit 13, a laser driving circuit 14, a reproducing circuit 15, and a control section 20. The pickup driving circuit 13, the laser driving circuit 14, and the reproducing circuit 15 constitute a recording/reproducing circuit group 10. The optical disc device 1 is a device for recording information on the optical % disc 2 and reproducing information from the optical disc 2. The optical disc 2 may be any optical disc such as a magneto-optical disc, and is not limited to a particular kind.

The optical head 11 is included in the pickup 12. The optical head 11 irradiates a light beam (i.e., a laser beam) onto the optical disc 2 so as to record/reproduce information. Also, the optical head 11 detects light reflected from the optical disc 2 and outputs the result of the detection to the reproducing circuit 15. The pickup 12, which includes the optical head 11, records and reproduces data. The pickup 12 can be moved in the direction of an optical axis and in a radial direction of the optical disc 2.

The pickup driving circuit 13 drives the pickup 12 in accordance with a control signal from the control section 20, and moves the pickup 12 toward a track (not illustrated) of the optical disc 2, that is, in the radial direction and in the direction of the optical axis. The laser driving circuit 14 controls an output of a light beam irradiated from the optical head 11. The reproducing circuit 15 converts the reflected light which is detected by the optical head 11 into a reproduced signal, and outputs the reproduced signal to the control section 20.

The control section 20 sets a recording parameter of a recording mark, which is information to be stored in the optical disc 2. Also, the control section 20 moves the pickup 12 by using the pickup driving circuit 13, and causes the optical head 11 to irradiate a light beam by using the laser driving circuit 14. In addition, the control section 20 receives, from the reproducing circuit 15, the reproduced signal which is obtained by the conversion of the reflected light detected by the optical head 11. The control section 20 will be described in detail later.

Figure 3:
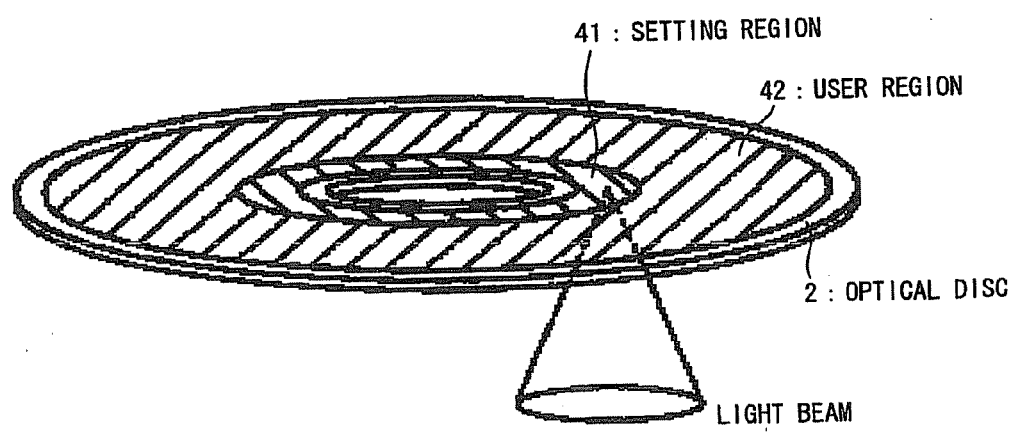
FIG. 3 is a perspective view of an optical disc on which information is recorded by the optical disc device.

Next, with reference to FIG. 3, the optical disc 2 on which information is recorded by the optical disc device 1 is described schematically. The optical disc 2 includes, as shown in FIG. 3, a setting region 41 and a user region 42. The setting region 41 is a region (i.e., a section) in which trial recording of information is carried out, and the user region 42 is a section in which information desired by a user is to be recorded. Also, the setting region 41 is a region which stores a look-up table described later.

Note that the position of the setting region 41 is not limited to the position illustrated in FIG. 3. The setting region 41 may exist in any position within the radius of the optical disc 2. Also, a plurality of setting regions 41 may be provided.

Next, the following operation is briefly described: operation for recording information on the optical disc 2 by using the optical disc device 1; and operation for reproducing, by using the optical disc device 1, information recorded on the optical disc 2.

The optical disc device 1 records information on the optical disc 2 such that: firstly, the control section 20 sets a recording parameter in accordance with the recording information; secondly, the optical head 11 irradiates a recording light beam (i.e., a light beam for recording) onto the setting region 41 on the optical disc 2, thereby recording the information in a track of the setting region 41 on the optical disc 2. The optical disc device 1 reproduces information recorded on the optical disc 2 such that: firstly, the control section 20 moves, by using the pickup driving circuit 13, the pickup 12 to a recorded section (on which the information is recorded) of either of the setting region 41 or the user region 42, each of which is provided on the optical disc 2; secondly, the control section 20 causes, by using the laser driving circuit 14, the optical head 11 to irradiate a reproducing light beam (i.e., a light beam for reproducing) onto a track of a recorded section (on which the information is recorded) on the optical disc 2; and light reflected from the track is detected by the optical head 11 and then converted into a reproduced signal by the reproducing circuit 15 and inputted to the control section 20. Thus, the optical disc device 1 reproduces the information recorded in the track on the optical disc 2. The recording information here means binary digital data recorded on the optical disc 2 (i.e., the information recording medium). The binary digital data is expressed by (i) two states including a state where a recording mark is formed on the optical disc 2 (i.e., a mark) and a state where a recording mark is not formed on the optical disc 2 (i.e., a space) and (ii) each length of the two states. That is, the followings are specified in the recording information: (i) the two states including the state where a recording mark is formed on the optical disc 2 (i.e., the mark) and the state where a recording mark is not formed on the optical disc 2 (i.e., the space); and (ii) each length of the two states (each of (i) and (ii) is set in a recording parameter).

The optical disc device 1 in accordance with the present embodiment firstly carries out recording (i.e., trial recording) on the setting region 41 on the optical disc 2 as described above, and then sets a recording parameter by using the control section 20 in accordance with a value of a reproduced signal obtained by reproduction of the information recorded in the trial recording. Then, the optical disc device 1 records the information in a track on the user region 42 in accordance with the recording parameter thus set. Recording operation with respect to the user region 42 after the optical disc device 1 sets the recording parameter is similar to recording operation which is commonly known. Therefore, the detailed description of the recording operation with respect to the user region 42 is omitted here. The recording parameter setting operation carried out by the control section 20 will be described later in detail in the description of the control section 20.

Ahead of the detailed descriptions of the control section 20 and the recording parameter setting operation carried out by the control section 20, a recording parameter is described with reference to FIG. 4 and FIG. 5. The description given here is based on (1, 7) RLL (Run Length Limited code) as one of the examples of a modulation method. Note that the modulation method is not limited to the (1, 7) RLL in the present embodiment. The (1, 7) RLL code is a code which limits a minimum value and a maximum value of an inversion interval in magnetic digital recording and optical digital recording.

In the (1, 7) RLL modulation method, a shortest recording mark of 2T has a pulse sequence of a recording pulse including a top section and a last section. A recording mark which is longer than the shortest recording mark has a pulse sequence of a recording pulse including the top section, the last section, and an intermediate section which is provided between the top section and the last section and whose length is determined in accordance with the mark length. This will be described in detail later. In other modulation methods, for example, the shortest recording mark may be 3T (e.g., a DVD-RW). In this case, a shortest recording mark may include a top section, an intermediate section, and a last section. In another case, a shortest recording mark may include a top section only (e.g., a DVD-R). The symbol "T" herein represents a time equivalent to one cycle of a clock. For example, a 3T recording mark length indicates a recording region where a recording mark is formed in time equivalent to three cycles of the clock.

Figure 4:
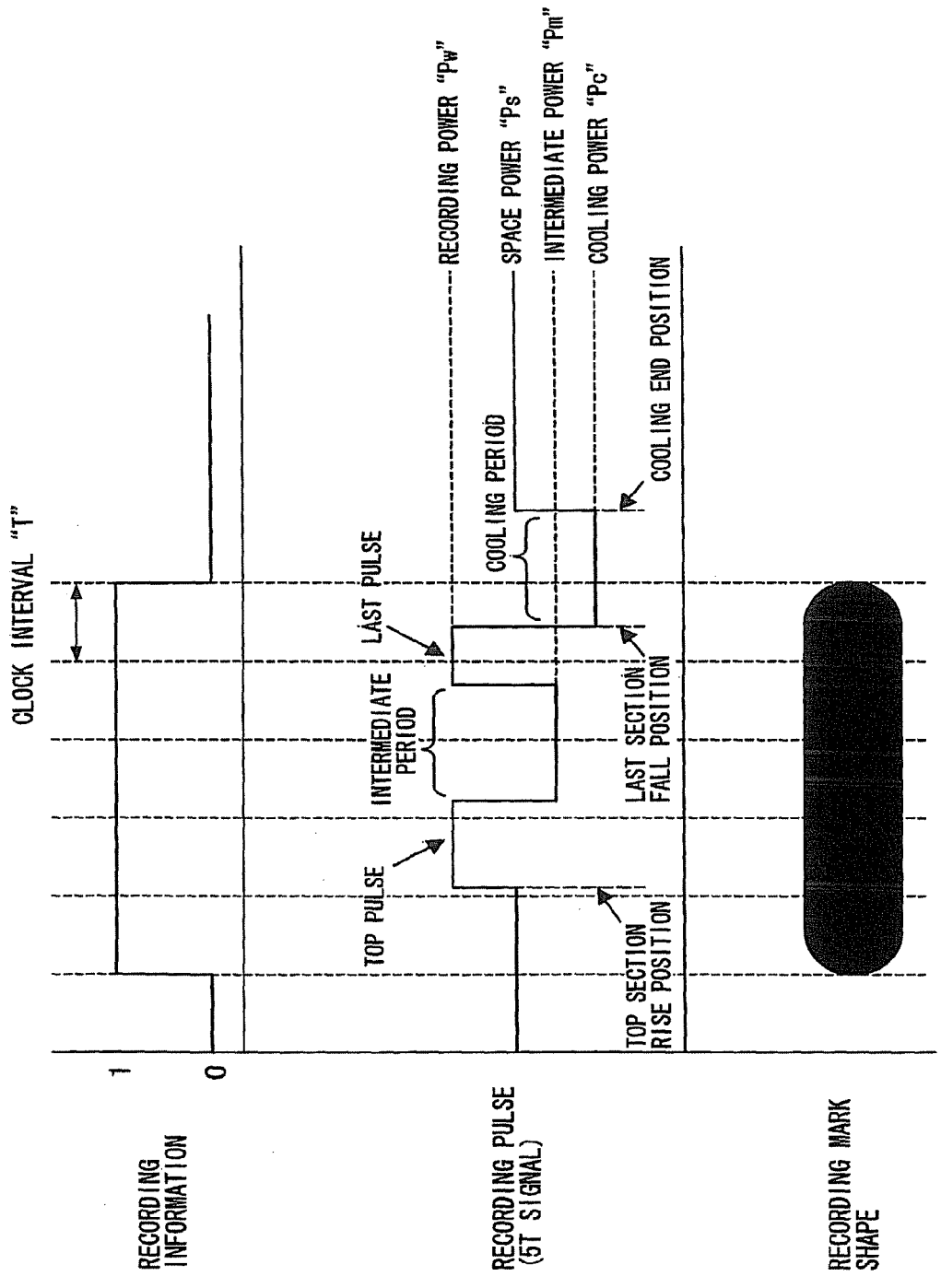
FIG. 4 is a timing chart illustrating a setting of a pulse sequence corresponding to recording information.

As illustrated in FIG. 4, a pulse sequence of a recording pulse corresponding to recording information is set in the optical disc 2 in consideration of a medium temperature distribution for carrying out recording. FIG. 4 shows a recording pulse corresponding to recording information, where the recording information is a recording mark length of 5T, for example. A pulse sequence of a recording pulse is expressed by time and recording pulse power. In FIG. 4, the horizontal axis indicates irradiation time, and the vertical axis indicates recording pulse power.

As described above, a pulse sequence includes a top section, a last section, and an intermediate section. As illustrated in FIG. 4, the top section here includes a top section rise position and a top pulse; the last section here includes a last pulse, a last section fall position, a cooling period, and a cooling end position; and the intermediate section here includes an intermediate period provided between the top pulse and the last pulse. As illustrated in FIG. 4, the pulse sequence is formed from recording power, space power, intermediate power, and bias (cooling) power. In the present embodiment, the recording power, the space power, the intermediate power, and the bias (cooling) power form a pulse sequence, and are termed "recording power parameter". These recording power parameters are included in the foregoing recording parameters. In FIG. 4, the recording power of the recording pulse of the top section and the recording power of the recording pulse of the last section are identical to each other. However, the present invention is not limited to this. The recording power of the top section and the recording power of the last section may be different from each other. Also, in FIG. 4, the smallest power is the bias (cooling) power, the intermediate power, the space power, and the recording power, in this order. However, the present invention is not limited to this. Note that, it is preferable that the recording power of the recording pulse of either of the top section or the last section has the highest value and the cooling power has the lowest value.

Figure 5:
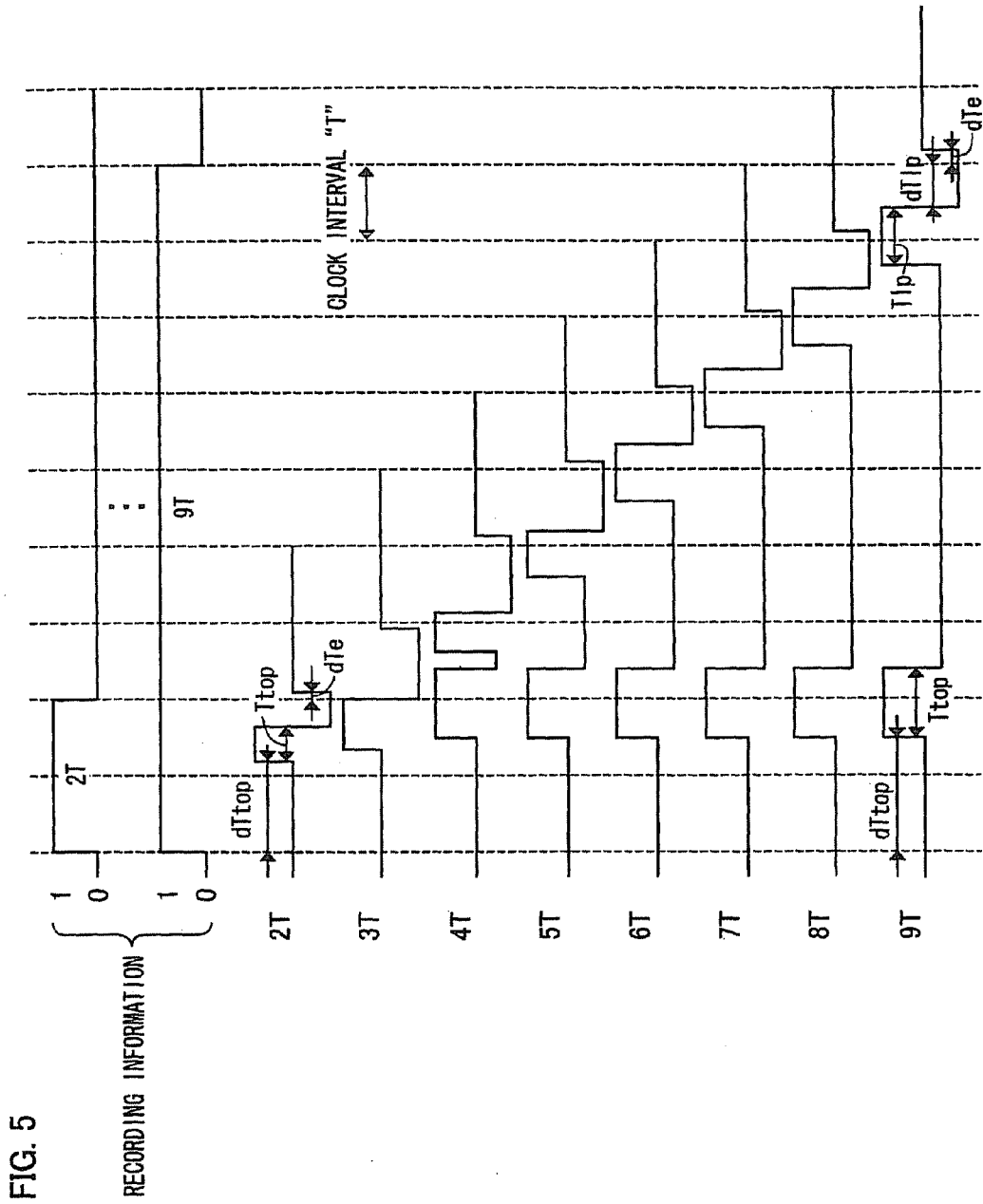
FIG. 5 is a timing chart illustrating a pulse sequence and a recording pulse parameter for forming recording marks whose lengths are 2T through 9T.

FIG. 5 illustrates pulse sequences and recording pulse parameters for forming recording marks of recording mark lengths of 2T through 9T. FIG. 5 shows the following example: each of the recording marks of the recording mark lengths of 2T and 3T includes a top pulse and a cooling period, and each of the recording marks of the recording mark lengths of 4T or longer includes a top pulse, an intermediate period, a last pulse, and a cooling period. In FIG. 5, "dTtop" indicates a top section rise position at which a top pulse starts; "Ttop" indicates the width of a top pulse; "dTe" indicates a cooling end position at which a cooling period in a last section ends; "Tlp" indicates the width of a last pulse; and "dTlp" indicates a fall position of the last pulse (i.e., a last section fall position). Also, "dTlp" indicates, as well as the fall position of the last pulse, a cooling start position at which a cooling period in a last section of the pulse sequence starts. Further, "dTe" indicates, as well as the cooling end position at which the cooling period in the last section ends, a start position of a space power "Ps" irradiation period, which subsequently starts following the cooling period. Each of "dTtop", "dTe", and "dTlp" is set in accordance with time from a reference timing of a clock. Specifically, "dTtop" is set in accordance with time based on a rise position of recording information corresponding to each recording mark length (i.e., a position at which the value changes from 0 to 1); and "dTe" and "dTlp" are set in accordance with time based on a fall position of recording information corresponding to each recording mark length (i.e., a position at which the value changes from 1 to 0). At this time, the same reference is used for all the recording mark lengths. In FIG. 5, "dTtop" is set in accordance with time based on the rise position of the recording information as described above. However, "dTtop" may be set in accordance with time based on a position that is shifted by a predetermined clock-interval from the rise position of the recording information. Similarly, in FIG. 5, "dTe" and "dTlp" are set in accordance with time based on the fall position of the recording information as described above. However, "dTe" and "dTlp" may be set in accordance with time based on a position that is shifted by a predetermined clock-interval from the fall position of the recording information. Also, "dTe" and "dTlp" may have different amount of shifting of the standard position from the fall position of the recording information. In the present embodiment, "dTtop", "Ttop", "dTe", "Tlp", and "dTlp", each of which defines timing in a recording pulse, are termed "recording pulse parameter". These recording pulse parameters are included in the foregoing recording parameters.

In FIG. 5, "Ttop" defines the width of the top pulse. However, the period in which the top pulse is risen may also be expressed by setting a recording pulse parameter at the fall position of the top pulse. Similarly, "Tlp" defines the width of the last pulse. However, the period in which the last pulse is risen may also be expressed by setting a recording pulse parameter at the rise position of the last pulse.

Changing the value of a recording pulse parameter changes the shape of a recording mark to be formed. The shape of a front edge, at which a forming process of a recording mark starts, is changed by "dTtop" and "Ttop", by which a top section is formed. That is, the parameters "dTtop" and "Ttop" out of the recording pulse parameters are capable of controlling the heat of the front edge. Also, the shape of a rear edge, at which a forming process of a recording mark ends, is changed by "dTe", "Tlp", and "dTlp", by which a last section is formed. That is, the parameters "dTe", "Tlp", and "dTlp" out of the recording pulse parameters are capable of controlling the heat of the rear edge. Further, changing the value of an intermediate power out of the recording power parameters changes the amount of heat accumulated at the intermediate section. That is, the intermediate power parameter out of the recording power parameters is capable of controlling the shape of a recording mark in a range between the front edge and the rear edge.

The values of the recording parameters including the foregoing recording power parameters and the recording pulse parameters are stored in the setting region 41 in a form of a look-up table (i.e., recording parameters). The look-up table is read out by the optical disc device 1, and is stored (i.e., recorded) in a storage section 3. The storage section 3 may be any one of an information recording medium (such as a memory), a server, and the like. Also, the storage section 3 may be provided in the optical disc device 1, or may be connected externally to the optical disc device 1. The look-up table will be described in detail later.

Figure 1:
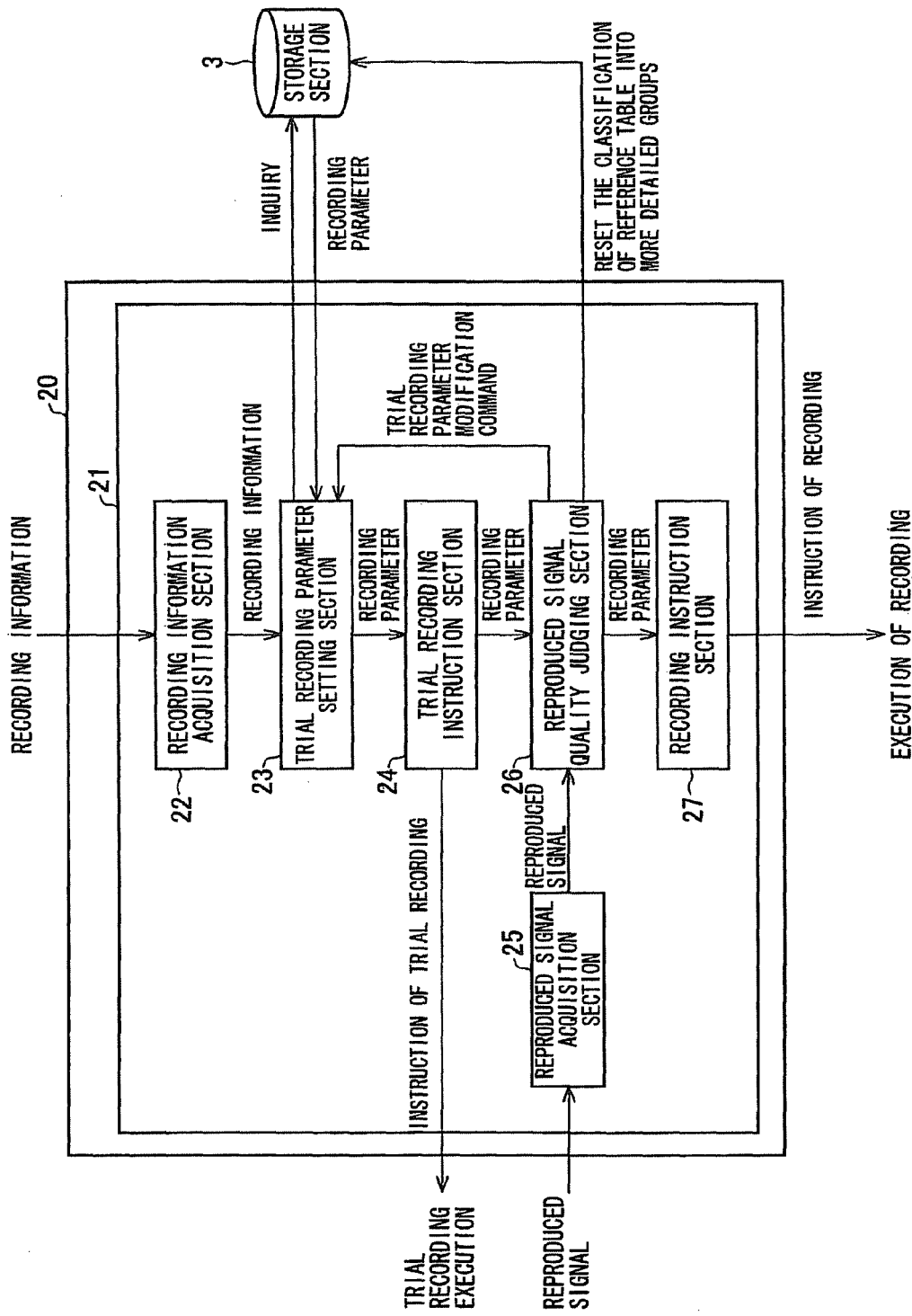
FIG. 1 is a functional block diagram illustrating one of the embodiments of a control section in an optical disc device in accordance with the present invention.

Next, the following gives the detail description of how the control section 20 in the optical disc device 1 sets a recording parameter. Firstly, with reference to FIG. 1, the outline of the arrangement of the control section 20 is described. FIG. 1 is a functional block diagram illustrating the arrangement of the control section 20 of the present embodiment.

As shown in FIG. 1, the control section 20 includes a recording parameter setting section (i.e., a recording parameter setting device) 21. The recording parameter setting section 21 carries out the following functions of the control section 20: (i) the function for setting a recording parameter of a recording mark, which is information to be recorded on the optical disc 2; (ii) the function for causing, by using the laser driving circuit 14, the optical head 11 to irradiate a light beam; and (iii) the function for receiving, from the reproducing circuit 15, a reproduced signal obtained by the conversion of reflected light detected by the optical head 11. The recording parameter setting section 21 includes a recording information acquisition section 22, a trial recording parameter setting section (i.e., trial recording parameter setting means) 23, a trial recording instruction section 24, a reproduced signal acquisition section 25, a reproduced signal quality judging section (i.e., reproduced signal quality judging means) 26, and a recording instruction section 27. The recording parameter setting section 21 carries out the above-mentioned functions by using these sections.

The recording information acquisition section 22 acquires recording information to be recorded on the optical disc 2. The recording information may be acquired from any one of the followings: a control section which is upper-level than the control section 20, a memory storing the recording information, a server storing the recording information, and the like. Also, the acquisition source of the recording information may be included in the optical disc device 1, or may be externally connected to the optical disc device 1.

The trial recording parameter setting section 23 sets a trial recording parameter for trial recording operation such that (i) the trial recording parameter setting section 23 inquires the storage section 3 in accordance with the recording information thus obtained by the record information acquisition section 22 and (ii) the trial recording parameter setting section 23 obtains, out of the recording parameters defined in the look-up table in the storage section 3, a recording parameter corresponding to the recording information. Also, the trial recording parameter setting section 23 resets the trial recording parameter when the trial recording parameter setting section 23 receives, from the reproduced signal quality judging section 26 (described later), a command to reset the trial recording parameter for the trial recording operation (i.e., a trial recording parameter modification command). The resetting of the trial recording parameter will be described later.

The trial recording instruction section 24 instructs the pickup driving circuit 13 and the laser driving circuit 14 to carry out the trial recording on the setting region 41 on the optical disc 2 in accordance with the trial recording parameter thus set by the trial recording parameter setting section 23.

When the trial recording of the recording mark is carried out on the setting region 41 on the optical disc 2 in accordance with the instruction from the trial recording instruction section 24, a reproduced signal is generated. The reproduced signal acquisition section 25 acquires the reproduced signal from the reproducing circuit 15.

The reproducing signal quality judging section 26 judges whether or not the trial recording parameter used in the trial recording is good, in accordance with the reproduced signal obtained by the reproduced signal acquisition section 25. This judgment depends on whether or not the reproduced signal obtained by the reproduced signal acquisition section 25 satisfies a predetermined reproduced signal quality. When the reproduced signal satisfies the predetermined reproduced signal quality, the reproduced signal quality judging section 26 determines (i.e., sets) the trial recording parameter used in the trial recording as the recording parameter, and transmits the recording parameter to the recording instruction section 27. When the reproduced signal does not satisfy the predetermined reproduced signal quality, the reproduced signal quality judging section 26 judges whether or not the number of classifications in the look-up table looked up by the trial recording parameter setting section 23 is equal to or greater than a predetermined value. When the number of the classifications in the look-up table is not equal to or greater than the predetermined value, the reproduced signal quality judging section 26 transmits, to the trial recording parameter setting section 23, a trial recording parameter modification command to reset the trial recording parameter. At the same time, the reproduced signal quality judging section 26 resets the classification in the look-up table stored in the storage section 3 so as to make the classification more detailed. When the number of classifications in the look-up table is equal to or greater than the predetermined value, the reproduced signal quality judging section 26 judges that an error occurs in the recording parameter setting operation. Then, the reproduced signal quality judging section 26 causes a display section (not illustrated) to display the error, and ends the recording parameter setting operation. The predetermined value will be described in detail later. The predetermined reproduced signal quality herein means: a reproduced signal quality which can be sufficiently compensated by an error modification function of a recording/reproducing device (the optical disc device 1 in the present embodiment); and a value which is set arbitrary in consideration of a quality fluctuation which occurs due to mass production of a recording/reproducing device, an optical disc (the optical disc 2 in the present embodiment), and the like. For the reproduced signal quality, jitter, an error rate, or the like may be used. When every optical disc has different bottom-level specs in jitter, an error rate, or the like, a bottom-level value prescribed by the specs may be used as a predetermined reproduced signal quality.

The recording instruction section 27 instructs the pickup driving circuit 13 and the laser driving circuit 14 to carry out recording operation on the user region 42 on the optical disc 2, in accordance with the recording parameter transmitted by the reproduced signal quality judging section 26.

Figure 6:
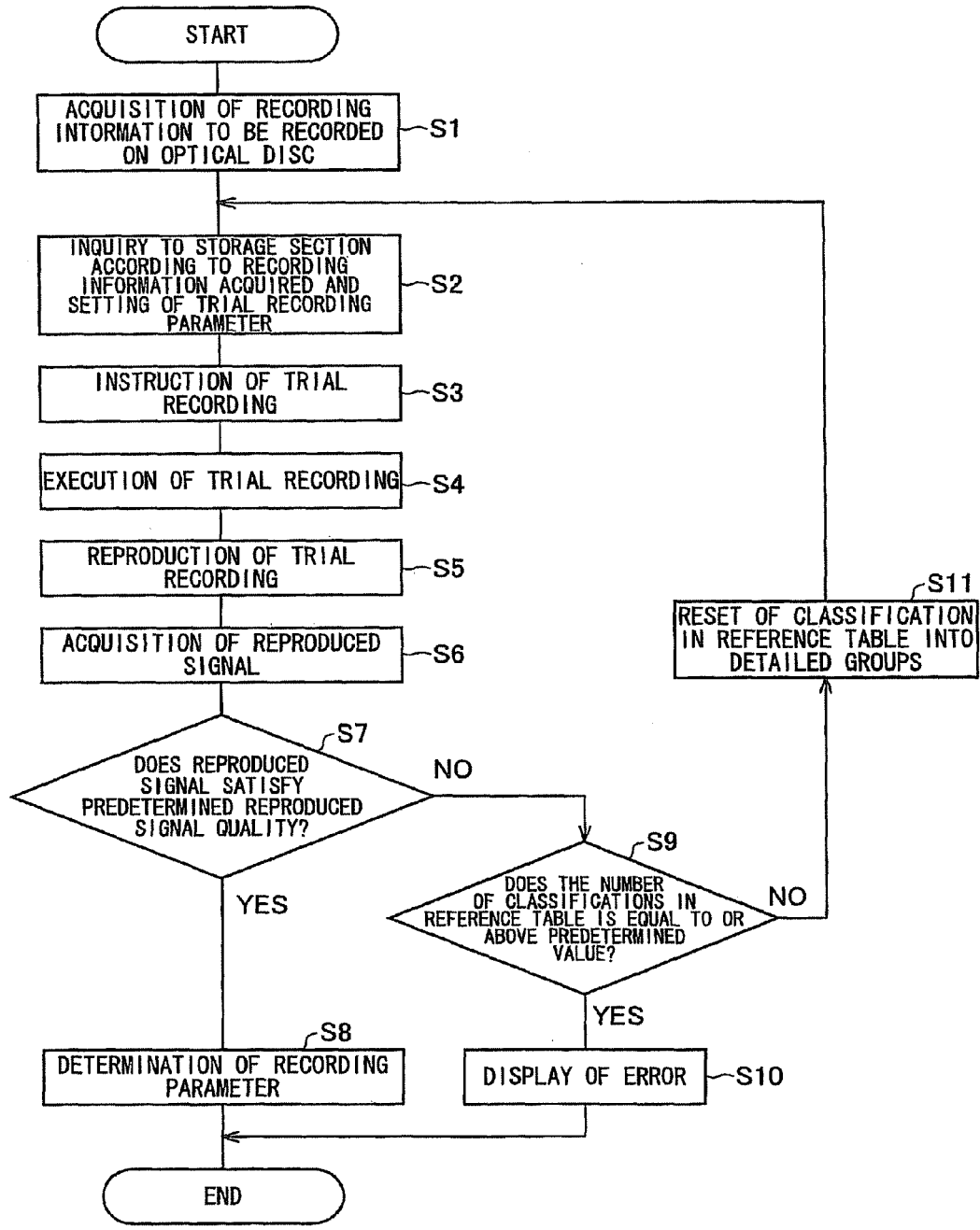
FIG. 6 is a flow chart illustrating a flow of recording parameter setting operation in the present invention.

The following description deals with the recording parameter setting operation in the optical disc device 1 with reference to FIGS. 6 through 11. FIG. 6 is a flow chart of the recording parameter setting operation in the present embodiment. FIG. 7 through FIG. 11 are a view illustrating a look-up table in the present embodiment.

Firstly, in Step S1, the recording information acquisition section 22 acquires recording information to be recorded on the optical disc 2. Secondly, in Step S2, the trial recording parameter setting section 23 inquires the storage section 3 in accordance with the recording information thus acquired by the recording information acquisition section 22, so as to set a trial recording parameter. Specifically, the trial recording parameter setting section 23 looks up a look-up table such as in FIG. 7 and FIG. 11 in accordance with the recording information, obtains a recording parameter corresponding to the recording information, and then sets a trial recording parameter. FIG. 7 shows a look-up table of "dTlp", which is a recording pulse parameter and indicates a fall position of a last pulse. The look-up table of "dTlp" is used as a look-up table for controlling heat of a rear edge, at which a forming process of a recording mark ends. In the look-up table in FIG. 7, recording mark lengths of 4T or longer are classified into one group. When the recording mark length of the recording information does not reach 4T, a recording parameter set by default is set as the recording parameter. When the recording mark length of the recording information is equal to or longer than 4T, a value ("b4" in FIG. 7) of a corresponding group in the look-up table is set as the recording parameter. For the default setting, for example, a value of "Ttop" or "dTlp" may be set in advance.

FIG. 11 show a look-up table of "dTtop", which is a recording pulse parameter and indicates a top section rise position. The look-up table of "dTtop" is used as a look-up table for controlling heat of a front edge, at which a forming process of a recording mark starts. In FIG. 11, recording mark lengths are classified into three groups: 2T, 3T, and 4T or longer. The number of classifications will not be changed in the trial recording carried out later. Therefore, the number of recording parameters for controlling the heat of the front edge will not increase any more.

As described above, each of the look-up tables in FIG. 7 and FIG. 11 is recorded on the setting region 41 on the disc. The optical disc device 1 reads out the look-up table, and stores the look-up table in the storage section 3. After that, the trial recording parameter setting section 23 looks up the look-up table in the storage section 3 so as to set a trial recording parameter. When "dTlp" is a fall position of a last pulse of a recording mark whose length is longer than 4T (i.e., 5T or longer), a value (i.e., "b4") for a recording mark length equal to 4T is set for "dTlp" by the trial recording parameter setting section 23. Also, when "dTtop" is a top section rise position of a recording mark whose length is longer than 4T (i.e., 5T or longer), a value (i.e., "c4") for a recording mark length of 4T is set for "dTtop" by the trial recording parameter setting section 23. That is, the trial recording parameter setting section 23 sets the same value for a recording mark length of 4T and for a recording mark length of 5T or longer. This shortens the read-out time, compared with a method in which a plurality of parameters are respectively set for recording mark lengths of 4T through 9 T and the plurality of parameters are read out. The trial recording parameter setting section 23 sets a certain value of the recording parameter in common for recording marks lengths of 4T through 9T. When trial recording is carried out, the trial recording parameter setting section 23 gives a certain amount of change in common to the recording mark lengths of 4T through 9T. That is, the value of the amount of change used in trial recording of a recording mark length of 4T is commonly used as the value of the amount of change used in trial recording of recording mark lengths of 4T through 9T.

In Step S3, the trial recording instruction section 24 instructs the pickup driving circuit 13 and the laser driving circuit 14 to carry out trial recording on the setting region 41 on the optical disc 2 in accordance with the trial recording parameter thus set by the trial recording parameter setting section 23. Next, in Step S4, the pickup driving circuit 13 and the laser driving circuit 14 cause the optical head 11 to record the information onto the setting region on the optical disc 2 in accordance with the trial recording parameter. Then, in Step S5, the optical head 11 reproduces the information, and a reproduced signal is generated by the reproducing circuit 15.

In Step S6, the reproduced signal acquisition section 25 acquires the reproduced signal, and transmits the reproduced signal to the reproduced signal quality judging section 26. In Step S7, the reproduced signal quality judging section 26 judges whether or not the reproduced signal acquired by the reproduced signal acquisition section 25 satisfies a predetermined reproduced signal quality. If the reproduced signal satisfies the predetermined reproduced signal quality (i.e., "YES" in Step S7), the procedure proceeds to Step S8. If the reproduced signal does not satisfy the predetermined reproduced signal quality (i.e., "NO" in Step S7), the procedure proceeds to Step S9. Specifically, the judgment whether or not the reproduced signal satisfies the predetermined reproduced signal quality is carried out by observing whether or not jitter (as the predetermined reproduced signal quality) satisfies a predetermined value (e.g., 6.5% or less).

In Step S8, the reproduced signal quality judging section 26 transmits, to the recording instruction section 27, the trial recording parameter used in the trial recording. This step sets (i.e., determines) the recording parameter for actually carrying out recording operation on the user section 42 on the optical disc 2. The recording parameter setting operation ends here.

In Step S9, the reproduced signal quality judging section 26 judges whether or not the number of classifications in the look-up table looked up by the trial recording parameter setting section 23 is equal to or greater than a predetermined value. If the number of classifications in the look-up table is equal to or greater than the predetermined value (i.e., "YES" in Step S9), the procedure proceeds to Step S10. If the number of classifications in the look-up table is not equal to or greater than the predetermined value (i.e., "NO" in Step S9), the procedure proceeds to Step S11. The predetermined value is described below. For example, in the look-up table in FIG. 7, the number of classifications is one. In the present embodiment, the maximum recording mark length is 9T. When the recording mark lengths of 4T through 9T are classified separately, the number of classifications in the look-up table is six, which is the maximum value. In this case, in Step S9, when the reproduced signal quality judging section 26 judges that the number of classifications in the look-up table looked up by the trial recording parameter setting section 23 is seven, a contradiction occurs because the actual number of classifications in the look-up table in FIG. 7 is six at maximum. This means an error in the recording parameter setting operation. Also, in Step S9, when the reproduced signal quality judging section 26 judges that the number of classifications in the look-up table looked up by the trial recording parameter setting section 23 is six, the number of classifications cannot be increased any more because the number of classifications judged by the reproduced signal quality judging section 26 is equal to the maximum number of classifications in the look-up table in FIG. 7. This also means an error in the recording parameter setting operation. Therefore, the present embodiment uses, as the foregoing predetermined value, the maximum number of classifications in the look-up table looked up by the trial recording parameter setting section 23. This makes it possible to detect an error in the recording parameter setting operation. Resetting the trial recording parameter used in the trial recording changes the look-up table looked up by the trial recording parameter setting section 23. The predetermined value changes in accordance with the maximum number of classifications in the look-up table which is changed when the look-up table changes as described above herein.

In Step S10, the reproduced signal quality judging section 26 causes a display section (not illustrated) to display an error so as to indicate that the recording parameter setting operation has an error. At the same time, the reproduced signal quality judging section 26 ends the recording parameter setting operation.

In Step S11, the reproduced signal quality judging section 26 transmits, to the trial recording parameter setting section 23, a trial recording parameter modification command to reset the trial recording parameter. Also, the reproduced signal quality judging section 26 resets the classification of the look-up table stored in the storage section 3 into more detailed groups. Specifically, a look-up table in which recording mark lengths of 4T or longer are classified into only one group is modified to be a look-up table (as shown in FIG. 8) in which recording mark lengths of 4T or longer are classified into two groups: 4T and 5T or longer. Then, the look-up table thus modified is set in the trial recording parameter setting section 23. This makes it possible to carry out the trial recording by separately controlling a setting value of a trial recording parameter of a recording mark length of 4T from a setting value of a trial recording parameter of a recording mark length of 5T or longer. After the trial recording parameter setting section 23 receives the trial recording parameter modification command, the trial recording parameter setting section 23 inquires the storage section 3 again. Then, the trial recording parameter setting section 23 obtains a recording parameter corresponding to the recording information from among the recording parameters defined in the look-up table in FIG. 8, so as to reset the trial recording parameter used in the trial recording operation. Here, the same value is set for recording mark lengths of 5T through 9T. Also, the same amount of change is given to recording mark lengths of 5T through 9T when the trial recording is carried out. That is, the value for a recording mark length of 5T is used commonly for recording mark lengths of 5T through 9T. After the look-up table is changed, the procedure returns to Step S2 and carries out the operation flow thereafter. Every time the procedure returns to Step S2 and the operation flow is carried out again, the classification of the look-up table stored in the storage section 3 is reset into more detailed groups as described above. Specifically, after the look-up table illustrated in FIG. 8 is used, the look-up table classified to have three groups of 4T, 5T, and 6T or longer (as illustrated in FIG. 9) is used. Further, after the look-up table illustrated in FIG. 9 is used, the look-up table classified to have four groups of 4T, 5T, 6T, and 7T or longer (as illustrated in FIG. 10) is used. Thus, the classification of the look-up table is reset into more detailed groups by stages.

In the present embodiment, recording mark lengths of 4T or longer (i.e., a predetermined recording mark length or longer) are classified into the same group both in (i) a look-up table for controlling heat of a front edge and (ii) a look-up table for controlling heat of a rear edge, both of the look-up tables of (i) and (ii) being stored in the storage section 3 at the time of starting the trial recording operation. However, the present invention is not limited to this. For example, out of the look-up table for controlling heat of a front edge and the look-up table for controlling heat of a rear edge each of which is stored in the storage section 3 at the time of starting the trial recording operation, it is preferable that the look-up table for controlling heat of a rear edge is classified to have more detailed groups than the look-up table for controlling heat of a front edge.

Also, out of the look-up table for controlling heat of a front edge and the look-up table for controlling heat of a rear edge, the look-up table for controlling heat of a rear edge may be recorded on the setting region 41 on the optical disc 2 as a table classified to have more detailed groups than the look-up table for controlling heat of a front edge. In this case, when the look-up table is read out by the optical disc device 1 and stored (i.e., recorded) in the storage section 3, the look-up table for controlling heat of a rear edge (out of the look-up table for controlling heat of a front edge and the look-up table for controlling heat of a rear edge each of which is stored in the storage section 3 at the time of starting the trial recording operation) is classified to have more detailed groups than the look-up table for controlling heat of a front edge. That is, the following look-up tables are included: (i) the look-up table for controlling heat of a front edge, in which look-up table recording marks whose lengths are equal to or longer than a predetermined recording mark length are classified into the same group; (ii) the look-up table for controlling heat of a rear edge, in which look-up table recording marks whose lengths are longer than the predetermined recording mark length is classified into the same group (i.e., a recording mark whose length is equal to the predetermined recording mark length and a recording mark whose length is longer than the predetermined recording mark length are separated and classified into different groups).

This allows the recording parameters for controlling heat of a rear edge of a recording mark to be classified into more detailed groups than the recording parameters for controlling heat of a front edge of a recording mark. Also, this reduces the number of recording parameters, compared with a method in which the recording parameters of both of a front edge and a rear edge are classified into the increased number of groups. A rear edge of a recording mark is more apt to be affected by heat than any other regions in the recording mark. Therefore, classifying a look-up table for controlling heat of a rear edge into more detailed groups allows to more strictly control heat of a rear edge, at which a forming process of a recording mark ends. This compensates the effect caused by accumulated heat, thereby forming a recording mark capable of providing a good reproduced signal quality.

The present embodiment is arranged such that a look-up table stored in the storage section 3 is set to have more detailed groups when a trial recording parameter is reset. However, the present invention is not limited to this. For example, the following is also possible: The storage section 3 stores, in advance, a plurality of look-up tables having different number of classifications (e.g., the storage section 3 stores, in advance, all of the look-up tables illustrated in FIG. 7, FIG. 8, FIG. 9, and FIG. 10); then, the trial recording parameter setting section 23 switches the look-up table to look up to another look-up table when the trial recording parameter is reset.

For example, there is a case where the look-up table illustrated in FIG. 10 is used as a look-up table of a recording parameter which is conclusively determined for a last pulse fall position "dTlp". In this case, "dTlp" (i.e., a recording parameter for controlling heat of a rear edge of a recording mark) is set so that recording mark lengths of 4T or longer are classified into groups of 4T, 5T, 6T, and 7T or longer as illustrated in FIG. 10. On the other hand, "dTtop" (i.e., a recording parameter for controlling heat of a front edge of a recording mark) is not reset by trial recording. Therefore, "dTtop" maintains the setting in Step S2 so that recording mark lengths are classified into three groups of 2T, 3T, and 4T or longer as illustrated in FIG. 11.

When a look-up table is recorded on the setting region 41 on the optical disc 2, a value corresponding to a recording mark length is recorded for, for example, the recording pulse parameters "dTtop" and "dTlp". Specifically, the values for the recording pulse parameters "dTtop" and "dTlp" as illustrated in FIG. 16 (a) and FIG. 16 (b) are recorded on the setting region 41.

As is clear from FIG. 16 (a) and FIG. 16 (b), the recording pulse parameter "dTtop" is classified and allocated to three regions of 2T, 3T, and 4T or longer; the recording pulse parameter "dTlp" is classified and allocated to four regions of 2T, 3T, 4T, and 5T or longer. That is, the regions for storing the values of the recording pulse parameter "dTtop" are allocated in accordance with the recording mark length, and one region is allocated for storing the value of the recording pulse parameter for a recording mark length equal to or longer than a predetermined recording mark length (i.e., 4T or longer in FIG. 16 (a)). Also, the regions for storing the values of the recording pulse parameter "dTlp" are allocated in accordance with the recording mark length, and one region is allocated for storing the value of the recording pulse parameter for a recording mark length equal to or longer than a predetermined recording mark length (i.e., 5T or longer in FIG. 16 (b)).

As described above, in a case where a look-up table is recorded on the setting region 41 on the optical disc 2, a look-up table for controlling heat of a rear edge so as to form the rear edge is classified to have more detailed groups than a look-up table for controlling heat of a front edge so as to form the front edge. That is, an operation effect of the present invention is attained by reading out a look-up table from the setting region 41 on the optical disc 2.

Note that the value in a look-up table to be recorded on the setting region 41 on the optical disc 2 may be a value that is recorded by the foregoing trial writing, or may be a value that is recorded as pre-stored information when various kinds of settings are carried out before shipment.

Figure 12:
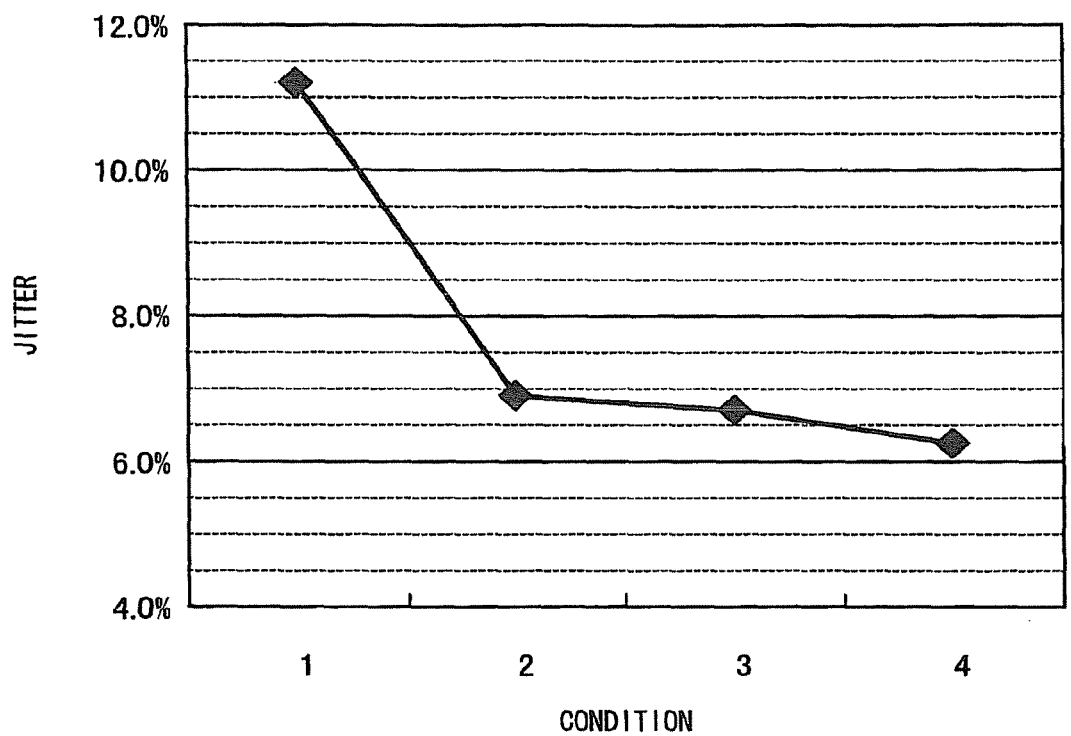
FIG. 12 is a view illustrating a change in jitter related to a recording parameter condition.

Next, an operation effect of the present invention is described with reference to FIG. 12. FIG. 12 is a view illustrating a correlation between a classification level of a look-up table and jitter in a reproduced signal generated by a recording mark.

In Condition 1, a recording parameter of a last pulse fall position "dTlp" uses the look-up table in FIG. 7. (In the look-up table in FIG. 7, recording parameters are classified into one group for a recording mark length of 4T or longer.) In Condition 2, a recording parameter of a last pulse fall position "dTlp" uses the look-up table in FIG. 8. (In the look-up table in FIG. 8, recording parameters are classified into two groups, a group for a recording mark length of 4T and a group for a recording mark length of 5T or longer.) In Condition 3, a recording parameter of a last pulse fall position "dTlp" uses the look-up table in FIG. 9. (In the look-up table in FIG. 9, recording parameters are classified into three groups, a group for a recording mark length of 4T, a group for a recording mark length of 5T, and a group for a recording mark length of 6T or longer.) In Condition 4, a recording parameter of a last pulse fall position "dTlp" uses the look-up table in FIG. 10. (In the look-up table in FIG. 10, recording parameters are classified into four groups, a group for a recording mark length of 4T, a group for a recording mark length of 5T, a group for a recording mark length of 6T, and a group for a recording mark length of 7T or longer.) For example, when a predetermined reproduced signal quality is "jitter is 6.5% or less", as is clear from FIG. 12, only Condition 4 can satisfy the predetermined reproduced signal quality. That is, if recording mark lengths are classified into too small number of groups so as to reduce the number of recording parameters, some conditions (such as Condition 1, Condition 2, and Condition 3, in this case) cannot satisfy the predetermined reproduced signal quality. In view of this, in the present invention, when the look-up table of Condition 1 cannot satisfy the predetermined reproduced signal quality, the look-up table of Condition 2 is used. Thus, a look-up table can be reset and classified minutely to have more detailed groups until the predetermined reproduced signal quality is satisfied.

Note that the predetermined reproduced signal quality is not limited to "jitter is 6.5% or less". The predetermined reproduced signal quality herein means a level where an error in a reproduced signal can be corrected by the optical disc device 1. The predetermined reproduced signal quality only needs to be capable of ensuring allowance for a quality fluctuation in the optical disc device 1 or the optical disc 2 which occurs due to mass production or the other reasons. When the predetermined reproduced signal quality is, for example, "jitter is 7% or less", as is clear from FIG. 12, Conditions 2, 3, and 4 satisfy the predetermined reproduced signal quality.

Figure 15:
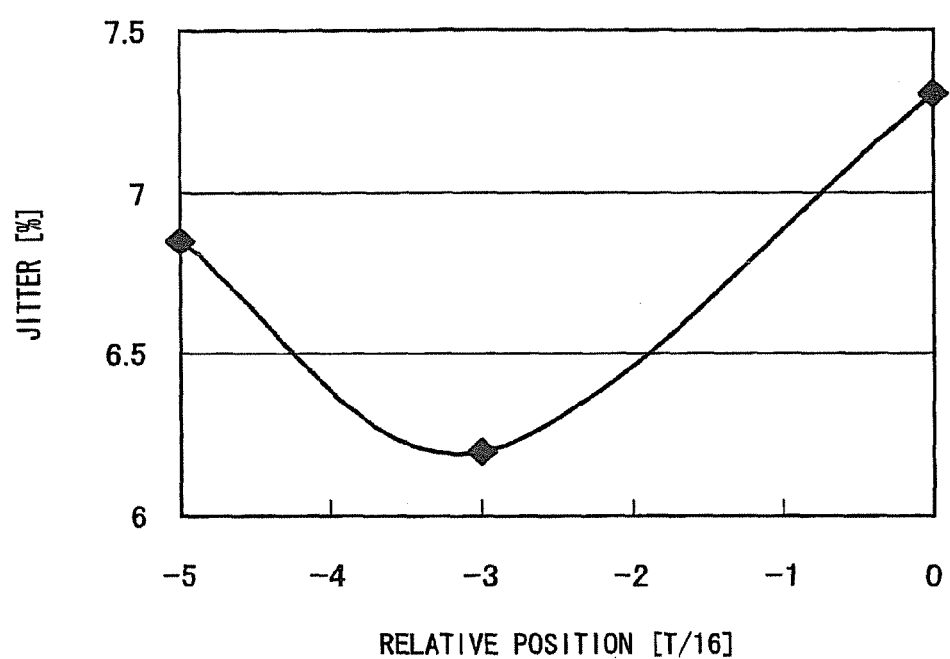
FIG. 15 is a view illustrating a change in jitter related to a recording parameter condition in the present invention.

Next, an operation effect of the present invention is described with reference to FIG. 15. FIG. 15 is a view illustrating a correlation between a relative position of "dTlp" and jitter in a reproduced signal generated by a recording mark, the correlation being observed when both of the following conditions are satisfied: (i) a recording parameter of a last pulse fall position "dTlp" adopts the look-up table in FIG. 8 (in which recording pulse parameters are classified into two groups, a group for a recording mark length of 4T and a group for a recording mark length of 5T or longer); (ii) the position of "dTlp" of a recording mark whose length is equal to or longer than 5T shifts in an earlier direction of a time axis (i.e., in an opposite direction to a time proceeding direction) relative to the position of "dTlp" of a recording mark whose length is equal to 4T. In this condition, the position of "dTlp" of the recording mark whose length is equal to or longer than 5T is shifted to the left in FIG. 4 and FIG. 5 because the time proceeding direction is represented by the direction from the left to the right in FIG. 4 and FIG. 5. A value of "dTlp" is set in accordance with time based on a fall position of recording information corresponding to a recording mark length. A clock interval "T" herein is approximately 3.8 ns, and the position of "dTlp" is shifted (i.e., moved) in every T/16. As illustrated in FIG. 15, when the position of "dTlp" of the recording mark whose length is equal to or longer than 5T is moved, based on a fall position of recording information, in an earlier direction of a time axis (i.e., in an opposite direction to a time proceeding direction) relative to the position of "dTlp" of the recording mark whose length is equal to 4T, the jitter becomes preferable once and then becomes worse gradually (specifically, the jitter gradually becomes preferable before the relative position reaches "−3", and the jitter gradually becomes worse when the relative position reaches and exceeds "−3"). When "dTlp" is shifted, the value of the last pulse width "Tlp" is not changed. Therefore, along with the shift of "dTlp", the rise position of "Tlp" approaches the fall position of the top pulse width "Ttop". As far as the fall position of "Ttop" does not overlap with the rise position of "Tlp", "dTlp" of the recording mark whose length is equal to or longer than 5T can be shifted in an opposite direction to a time proceeding direction.

The above-mentioned change in jitter is caused by the reason described below. Increasing a recording mark length elongates an intermediate period between a top pulse and a last pulse. This increases heat accumulated at a rear edge of a recording mark. In view of this, the position of "dTlp" of a recording mark whose length is equal to or longer than 5T (i.e., a long recording mark length) is shifted in an earlier direction so that the intermediate period is shortened and the heat accumulated at the rear edge is reduced. This makes the jitter more preferable than a case where the intermediate period is not shortened. However, if the position of "dTlp" is shifted in an earlier direction largely, the intermediate period will become too short to obtain sufficient heat for forming a rear edge of a recording mark. This makes the jitter worse. As illustrated in FIG. 15, the jitter becomes 7.0% or less, which is preferable, when the relative position of "dTlp" of a recording mark whose length is equal to or longer than 5T is within the range from −T/16 to −5T/16 ("+" herein represents a later direction of a time axis (i.e., a time proceeding direction)). Here, the relative position of "dTlp" of a recording mark whose length is equal to or longer than 5T is determined relative to "dTlp" of a recording mark whose length is equal to 4T.

As described above, such a look-up table is included that defines a recording parameter for controlling heat of at least a rear edge of a recording mark. The look-up table is classified in accordance with at least mark lengths out of the recording information. In the look-up table, the mark lengths equal to or longer than a predetermined mark length are classified into the same group. Trial recording is carried out by using a trial recording parameter which is set in accordance with the look-up table, and then the trial recording is reproduced. If the trial recording does not satisfy a predetermined reproduced signal quality, the look-up table for the mark lengths equal to or longer than the predetermined mark length is further classified into more detailed groups in accordance with the mark length. After that, trial recording is carried out and then reproduced, so that a look-up table which satisfies the predetermined reproduced signal quality is determined. This reduces, as much as possible, the number of recording parameters to be used, and controls heat of a rear edge at which a forming process of a recording mark ends. This compensates an effect caused by accumulated heat, thereby forming a recording mark capable of providing a good reproduced signal quality (i.e., a recording mark satisfying the predetermined reproduced signal quality).

A rear edge of a recording mark is more apt to be affected by heat than any other regions in the recording mark such as a front edge. Therefore, when a recording mark equal to or longer than a predetermined recording mark length is formed, simply controlling heat of a rear edge forms a recording mark capable of providing a good reproduced signal quality. That is, setting a recording parameter for controlling heat of at least a rear edge in accordance with the present invention makes it possible to form a recording mark capable of surely providing a good reproduced signal quality.

In an arrangement where a look-up table fixed in advance is used, when a recording condition of a track on the optical disc 2 changes along with the lapse of time, the look-up table cannot be changed accordingly so as to suit the change in the recording condition of the track. This may unable to form a recording mark capable of providing a good reproduced signal quality (i.e., a recording mark satisfying the predetermined reproduced signal quality) in a case where the recording condition of the track changes. In view of this, the present invention has an arrangement where a look-up table is further classified depending on the result of trial recording. Therefore, even when the recording condition of the track on the optical disc 2 changes along with the lapse of time, the look-up table can be classified again so as to suit the change in the recording condition of the track. That is, even when the recording condition of the track changes along with the lapse of time, a recording mark capable of providing a good reproduced signal quality (i.e., a recording mark satisfying the predetermined reproduced signal quality) can be formed.

The arrangement described below is also possible. After a look-up table of a recording parameter is set, the look-up table is recorded on the setting region 41 on the optical disc 2. When another recording operation is carried out later, the look-up table recorded on the setting region 41 is read out by the optical disc device 1, and the look-up table thus read out is used again so as to set a recording parameter. For example, when the look-up table in FIG. 10 is determined as a look-up table of a recording parameter of a last pulse fall position "dTlp", information indicative of this is recorded on the setting region 41 on the optical disc 2. This allows the optical disc device 1 to read out, from the setting region 41, the information contained in the look-up table in FIG. 10, and to use the information for the purpose of setting a recording parameter "dTlp" when another recording operation is carried out later.

With the foregoing arrangement, after a look-up table of a recording parameter is set in advance by carrying out trial recording, the look-up table can be used as a look-up table of a trial recording parameter in another recording operation. This makes it possible to reduce the number of trial recording carried out repeatedly until a recording parameter is determined. In addition, this eliminates the necessity of adding a new recording device such as a memory. This is because the setting region 41 on the optical disc 2 stores a look-up table of a recording parameter after the look-up table is set.

In the present embodiment, a recording parameter is used in a form of a table (i.e., a look-up table). However, the present invention is not limited to this. Recording parameters may be gathered into a group and stored in a storage section.

The classification in the look-up table of the present embodiment starts from a mark having a shorter length and is carried out in steps. However, the present invention is not limited to this, although a recording mark having a shorter length appears more frequently in data to be recorded on the user region 42. In trial recording, the data to be recorded on the user region 42 is not necessarily used as it is. Using data which is randomly selected gives an advantage such that a good reproduced signal quality can be achieved easily when recording marks are classified in steps from a recording mark having a shorter length. Also, classifying recording mark lengths in steps from a recording mark having a shorter length allows the number of classifications of recording parameters to be a number just needed to satisfy a predetermined reproduced signal quality. That is, this gives an advantage such that the number of recording parameters in a look-up table is easily set to a number just needed to satisfy a predetermined reproduced signal quality.

In the present embodiment, a recording mark length is used as recording information to be classified in a look-up table. However, the present invention is not limited to this. For example, both of a recording mark length and a space length may be classified as recording information in a look-up table. In this case, if the classification of a space length is not changed and only the classification of a recording mark length is changed, the number of recording parameters can be reduced as in the present embodiment.

Figure 13:
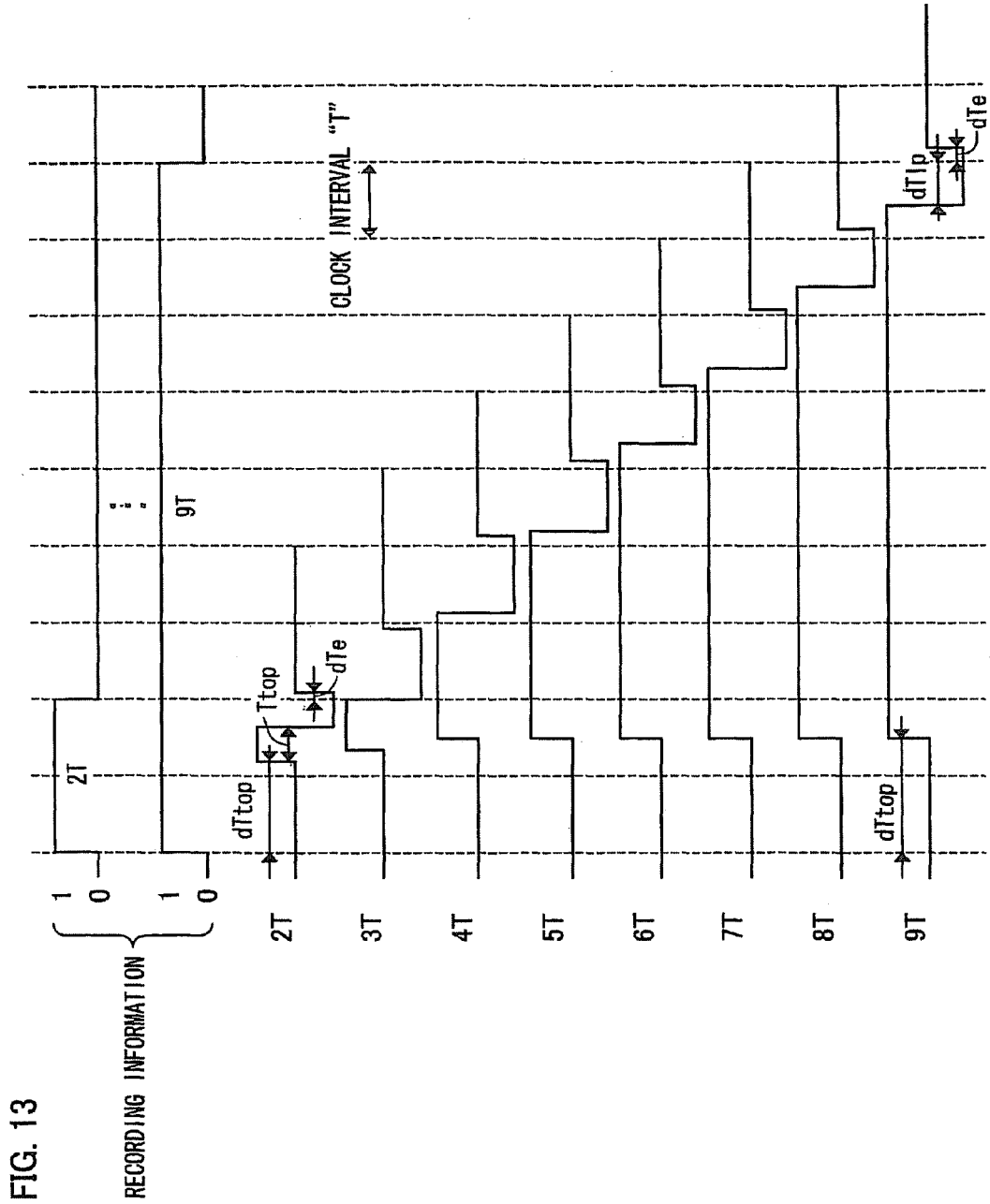
FIG. 13 is a timing chart illustrating one of the embodiments of a pulse sequence and a recording pulse parameter for forming recording marks whose lengths are 2T through 9T.
Figure 14:
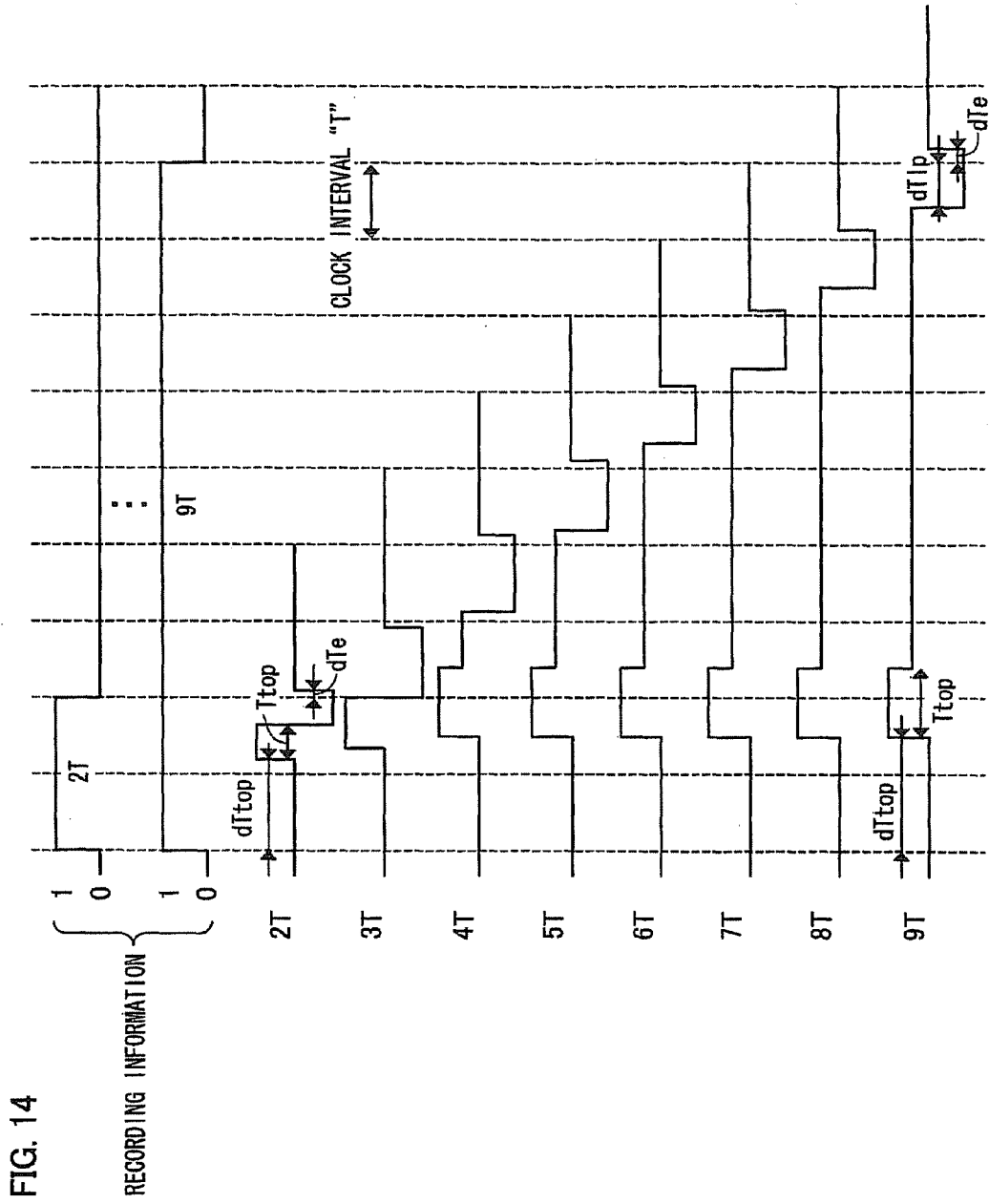
FIG. 14 is a timing chart illustrating one of the embodiments of a pulse sequence and a recording pulse parameter for forming recording marks whose lengths are 2T through 9T.

In the present embodiment, a last pulse fall position "dTlp" is described as one of the examples of a look-up table. However, the present invention may use a look-up table of "Tlp" (representing a last pulse width) or "dTe" (representing a cooling end position at which a cooling period ends) instead of "dTlp" so as to obtain a similar effect. This is because heat of a rear edge of a recording mark can also be controlled by using either of the look-up table of "Tlp" or "dTe". In a pulse sequence in FIG. 5, two pulses, a top pulse and a last pulse, are generated when a recording mark length is equal to or longer than 4T. In addition to the pulse sequence in FIG. 5, examples of the pulse sequence may encompass a pulse sequence in FIG. 13 and a pulse sequence in FIG. 14. In the pulse sequence in FIG. 13, intermediate power Pm and recording power Pw are set to be equal to each other, so that a recording mark is formed from one recording pulse. In the pulse sequence in FIG. 14, recording power Pw of a last pulse and intermediate power Pm are set to be equal to each other. The pulse sequences in FIG. 13 and FIG. 14 do not have "Tlp", which represents a last pulse width. Instead of "Tlp", a last pulse fall position "dTlp" (illustrated in FIG. 13 and FIG. 14) may be used. That is, when a recording medium which generates the pulse sequence illustrated in FIG. 13 or FIG. 14 is used, a look-up table of the last pulse fall position "dTlp" may be used. In this case, in FIG. 13, the position of "dTlp" may be shifted in an opposite direction to a time proceeding direction as far as the positions of "dTtop" and "dTlp" do not overlap with each other. Also, in FIG. 14, the position of "dTlp" may be shifted in an opposite direction to a time proceeding direction as far as the fall position of "Ttop" and the position of "dTlp" do not overlap with each other.

In the present embodiment, a top section rise position "dTtop" is used as a recording parameter for controlling heat of a front edge. However, the present invention is not limited to this. A top pulse width "Ttop" may be used as a recording parameter instead of "dTtop".

Also, the present embodiment has an arrangement where a recording parameter for controlling heat of a front edge is not reset by trial recording. However, the present invention is not limited to this. For example, the present invention may have an arrangement where a recording parameter for controlling heat of a front edge is reset by trial recording, as well as a recording parameter for controlling heat of a rear edge. In this case, the recording parameter for controlling the heat of the front edge may be reset in a similar manner to the manner in which the recording parameter for controlling the heat of the rear edge is reset.

In the present embodiment, the following two steps are carried out in the recording parameter setting section 21: (i) a step for classifying recording parameters used for controlling heat of a front edge into the same group if the recording mark length is equal to or longer than a predetermined recording mark length (a first step); (ii) a step for classifying, in accordance with at least recording mark lengths out of the recording information, recording parameters used for controlling heat of a rear edge and further classifying the recording parameters into more detailed groups than the recording parameters used for controlling the heat of the front edge if the recording mark length is equal to or longer than the predetermined recording mark length (a second step). However, the present invention may have an arrangement which uses different means from these steps, provided that the means is equivalent to each of the steps (i.e., the first step and the second step).

In the present embodiment, recording mark lengths of 4T or longer are classified into the same group in the look-up table used in the first trial recording. However, the present invention is not limited to this. The value of the recording mark length at which the recording marks are classified into the same group may be any positive integral number provided that the number is equal to or greater than the value of a predetermined recording mark length. The description "equal to or greater than the value of the predetermined recording mark length" herein indicates a range of the recording mark length in which a rear edge is supposed not to be affected by heat accumulated at a front edge of a recording mark, that is, in which the recording parameter of the rear edge is supposed to be controlled separately from the recording parameter of the front edge. The predetermined recording mark length is arbitrary set depending on the type of an information recording medium (i.e., the optical disc 2 in the present embodiment).

In the present embodiment, jitter is used as an example for judging a reproduced signal quality of trial recording. However, the present invention is not limited to this. For example, an error rate or the like may be used for judging a reproduced signal quality. Any index may be used as far as the index can judge the reproduced signal quality of trial recording.

The present embodiment uses (1, 7) RLL code as a run-length limitation code of d=1. However, the present invention is not limited to this. Other modulation methods or other codes may be used.

The present embodiment uses the optical disc device 1 which uses a light modulation recording method. However, the present invention is not limited to this. An optical disc device which uses a magneto-optical modulation method may be used as an alternative. Further, the present embodiment uses the optical disc device 1 as an example of a recording/reproducing device. However, the present invention is not limited to this. The device only needs to record information by heating the surface of an information recording medium so as to change the physical characteristics of the information recording medium. For example, a magnetic recording device or a magneto-optical disc device may be used as well as the optical disc device 1.

The sections and the processing steps included in the recording parameter setting section 21 of the present embodiment can be realized by the following: arithmetic means (such as a CPU) for executing a program stored in storage means (such as a ROM (Read Only Memory) or a RAM) and controlling input means (such as a keyboard), output means (such as a display), or communication means (such as an interface circuit). Therefore, when a computer including the foregoing means reads out the program stored in a recording medium and executes the program, various kinds of functions and processes to be carried out by the recording parameter setting section 21 of the present embodiment can be realized. Also, the various kinds of functions and processes can be realized on a desired computer by storing the program in a removable recording medium.

The recording medium may be a program medium such as: a memory (not illustrated) such as a ROM for carrying out a process by using a microcomputer; and a program medium which is readable when a recording medium is inserted into a program reading device (not illustrated) provided as an external storage device.

In any case, it is preferable that the program to be stored is accessed and executed by a microprocessor. Further, it is preferable that the program is read out and downloaded to a program storage area in the microcomputer and then is executed. A program for downloading should be stored in advance in a main device including the microcomputer.

The program medium may be a storage medium which is removable from a body and which supports a program in a fixed manner. More specifically, examples of the storage medium may encompass: tape such as magnetic tape and cassette tape; a magnetic disc such as a flexible disc and a hard disc; a disc such as a CD, MO, MD, and DVD; a card such as an IC card (including a memory card); and a semi-conductor memory such as a mask ROM, an EPROM (Erasable Programmable Read Only Memory), an EEPROM (Electrically Erasable Programmable Read Only Memory), and a flash ROM.

In a system arrangement where a communication network (including the Internet) can be connected, it is preferable to have a storage medium which supports a program in a flowing manner such as a manner in which the program is downloaded from the communication network.

Further, when a program downloaded from the communication network as described above is used, it is preferable that a program for downloading is stored in a main device in advance or is installed from another storage medium.

With the present invention, the process of determining a recording parameter which satisfies a predetermined reproduced signal quality is carried out while the number of classifications of recording parameters is being increased. As a result, the number of classifications of recording parameters at the time when the recording parameter satisfying the predetermined reproduced signal quality is determined is further reduced. Also, a recording parameter for controlling heat of at least a rear edge is determined so that the predetermined reproduced signal quality is satisfied. This compensates an effect caused by the heat accumulated at the rear edge, thereby forming a recording mark capable of providing a good reproduced signal quality. That is, the following effect is attained: a recording mark capable of surely providing a good reproduced signal quality can be formed while the number of recording parameters to be used is kept small.

A recording parameter setting device of the present invention is a recording parameter setting device configured to set a recording parameter for forming a recording mark on an information recording medium in accordance with recording information, comprising: (i) trial recording parameter setting means configured to inquire, in accordance with the recording information, a storage section containing recording parameters used for controlling heat of recording marks, and to set a trial recording parameter for carrying out trial recording, wherein (a) the recording parameters are used for controlling heat of at least rear edges of the recording marks at which rear edges a forming process of the recording marks ends, (b) the recording parameters are classified in accordance with at least recording mark lengths out of the recording information, and (c) recording parameters of a predetermined recording mark length or longer are classified into a same group; and (ii) reproduced signal quality judging means configured to further classify the recording parameters of the predetermined recording mark length or longer into more detailed groups and to cause to carry out the trial recording again if a reproduced signal obtained by reproduction of the trial recording carried out in accordance with the trial recording parameter does not satisfy a predetermined reproduced signal quality, and configured to set the trial recording parameter as the recording parameter if the reproduced signal satisfies the predetermined reproduced signal quality.

Also, in the recording parameter setting device of the present invention, it is preferable that the reproduced signal quality judging means further classifies the recording parameters of the predetermined recording mark length or longer into (a) a group for the recording mark length which is equal to the predetermined recording mark length and (b) another group for the recording mark length which is longer than the predetermined recording mark length, if the reproduced signal does not satisfy the predetermined reproduced signal quality.

Thus, the process of determining the recording parameter which satisfies the predetermined reproduced signal quality is carried out while the number of classifications of recording parameters is increased by one. As a result, the number of classifications of recording parameters at the time when the recording parameter satisfying the predetermined reproduced signal quality is determined becomes a number just needed to surely satisfy the predetermined reproduced signal quality. This makes it possible to form a recording mark capable of surely obtaining a good reproduced signal quality while the number of recording parameters to be used is reduced.

Also, in the recording parameter setting device of the present invention, it is preferable that the recording parameter is a last section fall position of a pulse sequence for forming the recording mark.

Setting the last section fall position of the pulse sequence for forming the recording mark as the recording parameter makes it possible to form a recording mark capable of surely providing a good reproduced signal quality while the number of recording parameters to be used is reduced.

Further, in the recording parameter setting device of the present invention, it is preferable that the recording parameter is a last pulse width of a pulse, sequence for forming the recording mark.

Setting the last pulse width of the pulse sequence for forming the recording mark as the recording parameter makes it possible to form a recording mark capable of surely providing a good reproduced signal quality while the number of recording parameters to be used is reduced.

In addition, it is preferable that the recording parameter setting device of the present invention is a recording parameter setting device configured to set a recording parameter for forming a recording mark on an information recording medium in accordance with recording information, wherein the recording parameters include: (a) recording parameters used for controlling heat of a front edge of the recording mark, classified in accordance with at least recording mark lengths out of the recording information, and classified into the same group if the recording mark length is equal to or longer than a predetermined recording mark length; and (b) recording parameters used for controlling heat of a rear edge of the recording mark, classified in accordance with at least the recording mark lengths out of the recording information, and classified into more detailed groups than the recording parameters used for controlling the heat of the front edge if the recording mark length is equal to or longer than the predetermined recording mark length.

Also, in the recording parameter setting device of the present invention, it is preferable that the recording parameter for controlling the heat of the rear edge of the recording mark is a last section fall position of a pulse sequence for forming the recording mark.

Setting the last section fall position of the pulse sequence for forming the recording mark as the recording parameter for controlling the heat of the rear edge makes it possible to form a recording mark capable of surely providing a good reproduced signal quality while the number of recording parameters to be used is reduced.

Further, in the recording parameter setting device of the present invention, it is preferable that the recording parameter for controlling the heat of the rear edge of the recording mark is a last pulse width of a pulse sequence for forming the recording mark.

Setting the last pulse width of the pulse sequence for forming the recording mark as the recording parameter for controlling the heat of the rear edge makes it possible to form a recording mark capable of surely providing a good reproduced signal quality while the number of recording parameters to be used is reduced.

In addition, in the recording parameter setting device of the present invention, it is preferable that the recording parameter for controlling the heat of the rear edge of the recording mark is a cooling end position at which a cooling period ends in a pulse sequence for forming the recording mark.

Setting the cooling end position at which the cooling period ends in the pulse sequence for forming the recording mark as the recording parameter for controlling the heat of the rear edge makes it possible to form a recording mark capable of surely providing a good reproduced signal quality while the number of recording parameters to be used is reduced.

Also, in the recording parameter setting device of the present invention, it is preferable that the recording parameter for controlling the heat of the front edge of the recording mark is a top section rise position of a pulse sequence for forming the recording mark.

Setting the top section rise position of the pulse sequence for forming the recording mark as the recording parameter for controlling the heat of the rear edge makes it possible to form a recording mark capable of surely providing a good reproduced signal quality while the number of recording parameters to be used is reduced.

Further, in the recording parameter setting device of the present invention, it is preferable that the recording parameter for controlling the heat of the front edge of the recording mark is a top pulse width of a pulse sequence for forming the recording mark.

Setting the top pulse width of the pulse sequence for forming the recording mark as the recording parameter for controlling the heat of the front edge makes it possible to form a recording mark capable of surely providing a good reproduced signal quality while the number of recording parameters to be used is reduced.

Also, in the recording parameter setting device of the present invention, it is preferable that the recording parameters for controlling the heat of the rear edge of the recording mark are classified into (a) a group for the recording mark length which is equal to the predetermined recording mark length and (b) another group for the recording mark length which is longer than the predetermined recording mark length, if the recording mark length is equal to or longer than the predetermined recording mark length.

That is, the number of classifications of recording parameters for controlling the heat of the rear edge of the recording mark is increased by one from the number of classifications of recording parameters for controlling the heat of the front edge of the recording mark. This makes it possible to form a recording mark capable of surely providing a good reproduced signal quality while the number of recording parameters to be used is reduced.

Also, in the recording parameter setting device of the present invention, it is preferable: that the recording parameters for controlling the heat of the rear edge of the recording mark are classified into (a) the group for the recording mark length which is equal to the predetermined recording mark length and (b) the another group for the recording mark length which is longer than the predetermined recording mark length, if the recording mark length is equal to or longer than the predetermined recording mark length; and that a value set for the recording parameter of the recording mark length which is longer than the predetermined recording mark length is different from a value set for the recording parameter of the recording mark length which is equal to the predetermined recording mark length.

As described above, the value set for the recording parameter of the recording mark length which is longer than the predetermined recording mark length is different from the value set for the recording parameter of the recording mark length which is equal to the predetermined recording mark length. As a result, even when the recording mark length which is longer than the predetermined recording mark length elongates so much that the jitter becomes deteriorated, the amount of heat accumulated at the rear edge is reduced by setting the recording parameter of the recording mark length which is longer than the predetermined recording mark length separately from the recording parameter of the recording mark length which is equal to the predetermined recording mark length. This makes it possible to form a recording mark capable of surely providing a good reproduced signal quality while the number of recording parameters to be used is reduced.

Further, in the recording parameter setting device of the present invention, it is preferable: that the recording parameter for controlling the heat of the rear edge of the recording mark is a last section fall position of a pulse sequence for forming the recording mark; and that the last section fall position of the pulse sequence for forming the recording mark whose length is longer than the predetermined recording mark length is set so as to be shifted, relative to the last section fall position of the pulse sequence for forming the recording mark whose length is equal to the predetermined recording mark length, in an opposite direction to a time proceeding direction (along a time axis) based on a fall position of recording information corresponding to each recording mark length.

This reduces the amount of the heat accumulated at the rear edge of the recording mark, the heat increasing when an intermediate period between the top pulse and the last pulse becomes longer as the recording mark length increases. That is, when the last section fall position of the pulse sequence for forming the recording mark whose length is not equal to but is longer than the predetermined recording mark length is relatively shifted in an opposite direction to a time proceeding direction (along a time axis), the intermediate period is shortened. This reduces the amount of the heat accumulated at the rear edge, thereby improving the jitter.

Also, in the recording parameter setting device of the present invention, it is preferable that the predetermined recording mark length is equal to or longer than 4T.

Thus, when the recording mark has a length equal to or longer than the predetermined recording mark length at which the rear edge is supposed not to be affected by the heat accumulated at the front edge of the recording mark, that is, at which the recording parameter of the rear edge is supposed to be controlled separately from the recording parameter of the front edge, the recording mark can be set so that the amount of the heat accumulated at the rear edge is reduced. This makes it possible to form a recording mark capable of surely providing a good reproduced signal quality while the number of recording parameters to be used is reduced.

The foregoing means of the recording parameter setting device may be executed on a computer by using a program. Also, the program may be executed on a desired computer by storing the program in a computer-readable recording medium.

The information recording medium of the present invention is configured to contain, in a predetermined region, the recording parameter which is set by any one of the foregoing recording parameter setting devices.

This makes it possible to form a recording mark capable of surely providing a good reproduced signal quality while the number of recording parameters to be used is reduced.

The recording/reproducing device of the present invention includes: an optical pickup configured to carry out a recording process and a reproducing process with respect to an information recording medium; and any one of the foregoing recording parameter setting devices.

This makes it possible to form a recording mark capable of surely providing a good reproduced signal quality while the number of recording parameters to be used is reduced.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A recording parameter setting device, a program thereof, a computer-readable recording medium containing the program, an information recording medium, a recording/reproducing device, and a recording parameter setting method, each of which relates to the present invention, make it possible to form a recording mark capable of surely providing a good reproduced signal quality while the number of recording parameters to be used is reduced. Therefore, the present invention is preferably used in an industrial field where an information recording medium such as an optical disc and a magneto-optical disc is used, particularly in an industrial field where an information recording medium capable of recording at a high speed is used.

The invention claimed is:

1. A reproduced signal quality judging method, performed by a reproducing device that reproduces signals from an information recording medium, said method comprising:
 (i) reproducing signals from recording marks previously recorded on an information recording medium by performing the steps of:
  generating laser pulse sequences in accordance with recording information;
  classifying recording parameters for top sections of a first predetermined recording mark length through a maximum recording mark length into same groups in accordance with at least recording mark lengths out of the recording information;
  classifying cooling start positions for cooling periods of a second predetermined recording mark length through the maximum recording mark length into a same group in accordance with at least recording mark lengths out of the recording information;
  controlling heat of front edges of the recording marks by using said classified recording parameters for top sections of the pulse sequences;
  controlling heat of rear edges of the recording marks by using said classified cooling start positions for cooling periods of the pulse sequences; and
  forming the recording marks of the first predetermined recording mark length through the maximum recording mark length based on the controlling steps;
  wherein the pulse sequences each include a top section including a top pulse; a last section including a cooling period; and an intermediate section including an intermediate period provided between the top section and the last section,
  wherein the second predetermined recording mark length is longer than the first predetermined recording mark length; and
 (ii) judging whether or not a reproduced signal obtained in step (i) has a reproduced signal quality that is capable of being compensated by an error modification function.

* * * * *